(12) United States Patent
Kawakami et al.

(10) Patent No.: US 6,730,434 B1
(45) Date of Patent: May 4, 2004

(54) ELECTRODE MATERIAL FOR ANODE OF RECHARGEABLE LITHIUM BATTERY, ELECTRODE STRUCTURAL BODY USING SAID ELECTRODE MATERIAL, RECHARGEABLE LITHIUM BATTERY USING SAID ELECTRODE STRUCTURAL BODY, PROCESS FOR PRODUCING SAID ELECTRODE STRUCTURAL BODY, AND PROCESS FOR PRODUCING SAID RECHARGEABLE LITHIUM BATTERY

(75) Inventors: Soichiro Kawakami, Nara (JP); Masaya Asao, Kyotanabe (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/554,727

(22) PCT Filed: Sep. 17, 1999

(86) PCT No.: PCT/JP99/05093

§ 371 (c)(1),
(2), (4) Date: Aug. 14, 2000

(87) PCT Pub. No.: WO00/17949

PCT Pub. Date: Mar. 30, 2000

(30) Foreign Application Priority Data

Sep. 18, 1998 (JP) .......................................... 10-282087
Feb. 26, 1999 (JP) .......................................... 11-050471

(51) Int. Cl.[7] .............................. H01M 6/14; H01M 4/48
(52) U.S. Cl. ............................. 429/218.1; 429/231.95
(58) Field of Search ..................... 429/231.8, 231.95, 429/218.1, 218.2, 223, 224

(56) References Cited

U.S. PATENT DOCUMENTS

| 4,163,829 A | 8/1979 | Kronenberg ................ 429/194 |
|---|---|---|
| 5,039,582 A | 8/1991 | Pistoia ....................... 429/218 |
| 5,506,075 A * | 4/1996 | Iwasaki et al. ............... 429/342 |
| 5,641,591 A | 6/1997 | Kawakami et al. ......... 429/218 |
| 5,702,845 A | 12/1997 | Kawakami et al. ......... 429/224 |
| 5,780,181 A * | 7/1998 | Idota et al. ................. 429/332 |
| 5,824,434 A | 10/1998 | Kawakami et al. ......... 429/209 |
| 5,919,589 A | 7/1999 | Kawakami et al. ...... 429/231.8 |
| 5,998,063 A | 12/1999 | Kobayashi et al. ...... 429/218.1 |
| 6,083,644 A * | 7/2000 | Watanabe et al. ........ 429/231.1 |

FOREIGN PATENT DOCUMENTS

| EP | WO 96/33519 | * 10/1996 | .......... H01M/10/24 |
|---|---|---|---|
| JP | 54-078434 | 6/1979 | |
| JP | 62-015761 | 1/1987 | |
| JP | 62-093866 | 4/1987 | |
| JP | 62-113366 | 5/1987 | |
| JP | 63-013264 | 1/1988 | |
| JP | 63-013267 | 1/1988 | |
| JP | 63-114057 | 5/1988 | |
| JP | 02-012768 | 1/1990 | |
| JP | 3-062464 | 3/1991 | |
| JP | 05-047381 | 2/1993 | |
| JP | 5-190171 | 7/1993 | |
| JP | 05-234585 | 9/1993 | |
| JP | 08-064239 | 3/1996 | |
| JP | 9245771 A | * 9/1997 | .......... H01M/10/24 |
| JP | 10-223221 | 8/1998 | |

* cited by examiner

*Primary Examiner*—Randy Gulakowski
*Assistant Examiner*—Monique Wills
(74) *Attorney, Agent, or Firm*—Fitzpatrick, Cella, Harper and Scinto

(57) ABSTRACT

An electrode material for an anode of a rechargeable lithium battery, containing a particulate comprising an amorphous M·A·X alloy with a substantially non-stoichiometric ratio composition. In the formula M·A·X, M indicates at least one kind of an element selected from a group consisting of Si, Ge, and Mg, A indicates at least one kind of an element selected from a group consisting of transition metal elements, and X indicates at least one kind of an element selected from a group consisting of Ba, Sr, Ca, La, Ce, C, P, B, Bi, Sb, Al, In, and Zn, where the element X is optionally present and the content of the constituent element M of the amorphous M·A·X alloy is M/(M+A+X)=20 to 80 atomic %.

53 Claims, 15 Drawing Sheets

ELECTRODE MATERIAL FOR ANODE OF RECHARGEABLE LITHIUM BATTERY, ELECTRODE STRUCTURAL BODY USING SAID ELECTRODE MATERIAL, RECHARGEABLE LITHIUM BATTERY USING SAID ELECTRODE STRUCTURAL BODY, PROCESS FOR PRODUCING SAID ELECTRODE STRUCTURAL BODY, AND PROCESS FOR PRODUCING SAID RECHARGEABLE LITHIUM BATTERY

BACKGROUND OF THE INVENTION

1. Field of the Invention

The present invention relates to an electrode material for an anode of a rechargeable lithium battery in which oxidation-reduction reaction of lithium is used (this battery will be hereinafter referred to as rechargeable lithium battery for simplification purpose), an electrode structural body using said electrode material, a rechargeable lithium battery having an anode comprising said electrode structural body, a process for producing said electrode structural body, and a process for producing said rechargeable lithium battery. More particularly, the present invention relates to an electrode structural body for a rechargeable lithium battery, which is constituted by an electrode material comprising a specific amorphous alloy and which provides a high capacity and a prolonged cycle life for said battery and to a rechargeable lithium battery having an anode comprising said electrode structural body. The present invention includes a process for producing said electrode structural body and a process for producing said rechargeable lithium battery.

2. Prior Art

In recent years, the global warming of the earth because of the so-called greenhouse effect due to an increase in the content of $CO_2$ gas in the air has been predicted. For instance, in thermal electric power plants, thermal energy obtained by burning a fossil fuel is being converted into electric energy, and along with burning of such fossil fuel, a large amount of $CO_2$ gas is being exhausted in the air. Accordingly, in order to suppress this situation, there is a tendency of prohibiting to newly establish a thermal electric power plant. Under these circumstances, so-called load leveling practice has been proposed in order to effectively utilize electric powers generated by power generators in thermal electric power plants or the like, wherein a surplus power unused in the night is stored in rechargeable batteries installed at general houses and the power thus stored is used in the daytime when the demand for power is increased, whereby the power consumption is leveled.

Now, for electric vehicles which do not exhaust any air polluting substances such as $CO_2$, $NO_x$, hydrocarbons and the like, there is an increased demand for developing a high performance rechargeable battery with a high energy density which can be effectively used therein. Besides, there is also an increased demand for developing a miniature, lightweight, high performance rechargeable battery usable as a power source for portable instruments such as small personal computers, word processors, video cameras, and cellular phones.

As such miniature, lightweight and high performance rechargeable battery, there has proposed various rocking chair type lithium ion batteries in which a carbonous material such as graphite capable of intercalating lithium ion at intercalation sites of its six-membered network plane provided by carbon atoms in the battery reaction upon charging is used as an anode material and a lithium intercalation compound capable of deintercalating said lithium ion from the intercalation in the battery reaction upon charging is used as a cathode material. Some of these lithium ion batteries have been practically used. However, for any of these lithium ion batteries whose anode comprising the carbonous material (the graphite), the theoretical amount of lithium which can be intercalated by the anode is only an amount of ⅙ per carbon atom. Because of this, in such lithium ion battery, when the amount of lithium intercalated by the anode comprising the carbonous material (the graphite) is made greater than the theoretical amount upon performing charging operation or when charging operation is performed under condition of high electric current density, there will be an unavoidable problem such that lithium is deposited in a dendritic state (that is, in the form of a dendrite) on the surface of the anode. This will result in causing internal-shorts between the anode and the cathode upon repeating the charging and discharging cycle. Therefore, it is difficult for the lithium ion battery whose anode comprising the carbonous material (the graphite) to achieve a sufficient charging and discharging cycle life. In addition, using this battery design, it is extremely difficult to attain a desirable rechargeable battery having a high energy density comparable to that of a primary lithium battery in which a metallic lithium is used as the anode active material.

Now, rechargeable lithium batteries in which a metallic lithium is used as the anode have been proposed and they have attracted public attention in a viewpoint that they exhibit a high energy density. However, such rechargeable battery is not practically usable one because its charging and discharging cycle life is extremely short. A main reason why the charging and discharging cycle life is extremely short has been generally considered as will be described in the following. The metallic lithium as the anode reacts with impurities such as moisture or an organic solvent contained in an electrolyte solution to form an insulating film or/and the metallic lithium as the anode has an irregular surface with portions to which electric field is converged, and these factors lead to generating a dendrite of lithium upon repeating the charging and discharging cycle, resulting in internal-shorts between the anode and cathode. As a result, the charging and discharging cycle life of the rechargeable battery is extremely shortened.

When the lithium dendrite is grown to make the anode and cathode such that the anode is internally shorted with the cathode as above described, the energy possessed by the battery is rapidly consumed at the internally shorted portion. This situation often creates problems in that the battery is heated or the solvent of the electrolyte is decomposed by virtue of heat to generate gas, resulting in an increase in the inner pressure of the battery. Thus, the growth of the lithium dendrite tends to cause internal-shorts between the anode and the cathode whereby occurring such problems as above described, where the battery is damaged or/and the lifetime of the battery is shortened.

In order to eliminate the above problems for such rechargeable battery in which the metallic lithium is used as the anode, specifically, in order to suppress the progress of the reaction between the metallic lithium of the anode and the moisture or the organic solvent contained in the electrolyte solution, there has been proposed a method of using a lithium alloy such as a lithium-aluminum alloy as the anode. However, this method is not widely applicable in practice for the following reasons. The lithium alloy is hard and is difficult to wind into a spiral form and therefore, it is difficult to produce a spiral-wound cylindrical rechargeable battery. Accordingly, it is difficult to attain a rechargeable battery having a sufficiently long charging and discharging cycle life. It is also difficult to attain a rechargeable battery having a desirable energy density similar to that of a primary battery in which a metallic lithium is used as the anode.

Japanese Unexamined Patent Publications Nos. 64239/1996, 62464/1991, 12768/1990, 113366/1987, 15761/1987, 93866/1987, and 78434/1979 disclose various metals, i.e., Al, Cd, In, Sn, Sb, Pb, and Bi which are capable of forming an alloy with lithium in a rechargeable battery when the battery is subjected to charging, and rechargeable batteries in which these metals, alloys of these metals, or alloys of these metals with lithium are used as the anodes. However, the above-mentioned publications do not detail about the configurations of the anodes.

By the way, when any of the foregoing alloy materials is fabricated into a plate-like form such as a foil form which is generally adopted as an electrode of a rechargeable battery and it is used as an anode of a rechargeable battery in which lithium is used as the anode active material, the specific surface area of a portion in the anode's electrode material layer contributing to the battery reaction is relatively small and therefore, the charging and discharging cycle is difficult to be effectively repeated with a large electric current.

Further, for a rechargeable battery in which any of the foregoing alloy materials is used the anode, there are such problems as will be described in the following. The anode is expanded with respect to the volume because of alloying with lithium upon charging and shrunk upon discharging, where the anode suffers from repetitive changes with respect to the volume. Because of this, the anode has a tendency that it is eventually distorted and cracked. In the case where the anode becomes to be in such state, when the charging and discharging cycle is repeated over a long period of time, in the worst case, the anode is converted into a pulverized state to have an increased impedance, resulting in shortening the charging and discharging cycle life. Hence, none of the rechargeable batteries disclosed in the above-mentioned Japanese publications has been put to practical use.

In Extended Abstracts WED-2 (pages 69–72) of 8th INTERNATIONAL MEETING ON LITHIUM BATTERIES (hereinafter referred to as document), there is described that by electrochemically depositing a Sn or a Sn-alloy on a copper wire having a diameter of 0.07 mm as a collector, an electrode having a deposited layer comprising a grained tin material with a small particle size of 200 to 400 nm can be formed, and a cell in which the electrode having such deposited layer with a thin thickness of about 3 $\mu$m and a counter electrode comprising a lithium metal are used has an improved charging and discharging cycle life. The above document also describes that in the evaluation wherein a cycle of operating charging up to 1.7 Li/Sn (one atom of Sn is alloyed with 1.7 atoms of Li) at a current density of 0.25 mA/cm$^2$ and operating discharging up to 0.9 V vs Li/Li$^+$ is repeated, an electrode comprising a fine-grained Sn material with a particle size of 200 to 400 nm, an electrode comprising a $Sn_{0.91}Ag_{0.09}$ alloy and an electrode comprising a $Sn_{0.72}Sb_{0.28}$ alloy were longer than an electrode comprising a coase-grained Sn alloy material with a particle size of 2000 to 4000 nm deposited on a collector comprising a copper wire having a diameter of 1.0 mm obtained in the same manner as in the above, in terms of the charging and discharging cycle life, respectively by about 4 times, about 9 times, and about 11 times. However, the evaluated results described in the above document are of the case where the lithium metal was used as the counter electrode and therefore, they are not evaluated results obtained in practical battery configurations. In addition, the foregoing electrodes are those prepared by depositing such grained material as above described on the collector comprising a copper wire having a diameter of 0.07 and therefore, any of them is not of a practically usable electrode form. Further in addition, according to the description of the above-mentioned document, in the case where a Sn alloy is deposited on a large area having a diameter of 1.0 mm for example, it is understood that there is afforded an electrode having a layer comprising a coarse-grained tin alloy material with a particle size of 2000 to 4000 nm. However, for this electrode, the lifetime as a battery will be extremely shortened.

Japanese Unexamined Patent Publications Nos. 190171/1993, 47381/1993, 114057/1988, and 13264/1988 disclose rechargeable lithium batteries in which various lithium alloys are used as the anodes. In these publications, there are described that these rechargeable lithium batteries prevent deposition of lithium dendrite and have an improved charging efficiency and an improved charging and discharging cycle life. Japanese Unexamined Patent Publication No. 234585/1993 discloses a rechargeable lithium battery having an anode comprising a metal powder, which is difficult to form an intermetallic compound with lithium, is uniformly bonded on the surface of a lithium metal. In this publication, it is described that this rechargeable lithium battery prevents deposition of lithium dendrite and has an improved charging efficiency and an improved charging and discharging cycle life.

However, any of the anodes described in the above-mentioned publications is not decisive one which can markedly prolong the charging and discharging cycle life of the rechargeable lithium battery.

Japanese Unexamined Patent Publication No. 13267/1988 discloses a rechargeable lithium battery in which a lithium alloy obtained by electrochemically alloying an amorphous metal comprising a plate-like aluminum alloy as a main example with lithium is used as the anode. This publication describes that this rechargeable lithium battery excels in charge-discharge characteristics. However, according to the technique described in this publication, it is difficult to realize a practically usable rechargeable lithium battery having a high capacity and a charging and discharging cycle life which falls in a practically usable region.

Japanese Unexamined Patent Publication No. 223221/1998 discloses a rechargeable lithium battery in which a low crystalline or amorphous intermetallic compound of an element selected from a group consisting of Al, Ge, Pb, Si, Sn, and Zn is used as the anode. This publication describes that this rechargeable lithium battery has a high capacity and excels in cycle characteristics. However, it is extremely difficult to industrially produce such low crystalline or amorphous intermetallic compound in practice. According to the technique described in this publication, it is difficult to realize a practically usable rechargeable lithium battery having a high capacity and a prolonged charging and discharging cycle life.

As above described, for the conventional rechargeable lithium batteries in which oxidation-reduction reaction of lithium is used, enlargement of their energy density and prolongation of their charging and discharging cycle life are massive subjects to be solved.

SUMMARY OF THE INVENTION

The present invention has been accomplished in view of the foregoing situation in the prior art for rechargeable lithium batteries.

An object of the present invention is to provide an electrode material for an anode which comprises an amorphous alloy, has excellent characteristics, and is suitable as a constituent of an anode of a rechargeable lithium battery (that is, a rechargeable battery in which oxidation-reduction reaction of lithium is used).

Another object of the present invention is to provide an electrode structural body constituted by said electrode material and which has a high capacity and a prolonged cycle life and is usable as an anode of a rechargeable lithium battery.

A further object of the present invention is to provide a rechargeable lithium battery having an anode comprising said electrode structural body and which has a prolonged charging and discharging cycle life and a high energy density.

A further object of the present invention is to provide a process for producing said electrode structural body and said rechargeable lithium battery.

The electrode material for an anode of a rechargeable lithium battery (the electrode material for an anode) provided according to the present invention is specifically characterized in that it contains a particulate comprising an amorphous M·A·X alloy with a substantially non-stoichiometric ratio composition. For the formula M·A·X, M indicates at least one kind of element selected from a group consisting of Si, Ge, and Mg; A indicates at least one kind of an element selected from a group consisting of transition metal elements, X indicates at least one kind of an element selected from a group consisting of O, F, N, Ba, Sr, Ca, La, Ce, C, P, B, S, Se, Te, Bi, Sb, Al, In, and Zn, where the element X is not always necessary to be contained. The content of the constituent element M of the amorphous M·A·X alloy is M/(M+A+X)=20 to 80 atomic % in terms of the number of atoms of each element (atom) of the entire constituent elements M, A and X. The electrode material has excellent characteristics and it is extremely suitable as a constituent (that is, an anode active material) of an anode of a rechargeable lithium battery.

The electrode structural body for an anode of a rechargeable lithium battery provided according to the present invention is specifically characterized in that it comprises an electrode material for an anode, containing a particulate comprising aforesaid amorphous M·A·X alloy. The electrode structural body has a high capacity and a prolonged cycle life and it is extremely suitable for use as an anode of a rechargeable lithium battery. Particularly, in the case of using this electrode structural body as an anode of a rechargeable lithium battery, the problems of the anode in the conventional rechargeable lithium battery in that when the charging and discharging cycle is repeated over a long period of time, the anode is expanded to deteriorate its current connecting performance, and therefore, it is difficult for the charging and discharging cycle life to be prolonged as desired are desirably solved.

The rechargeable lithium battery provided according to the present invention is specifically a rechargeable lithium battery comprising at least an anode, a cathode and an electrolyte and in which oxidation-reduction reaction is used, characterized in that said anode comprises aforesaid electrode structural body for an anode. The rechargeable lithium battery has a prolonged charging and discharging cycle life and provides a gently-sloping discharge curve, and it has a high capacity and a high energy density.

DESCRIPTION OF THE INVENTION AND PREFERRED EMBODIMENTS

Figure 1A:
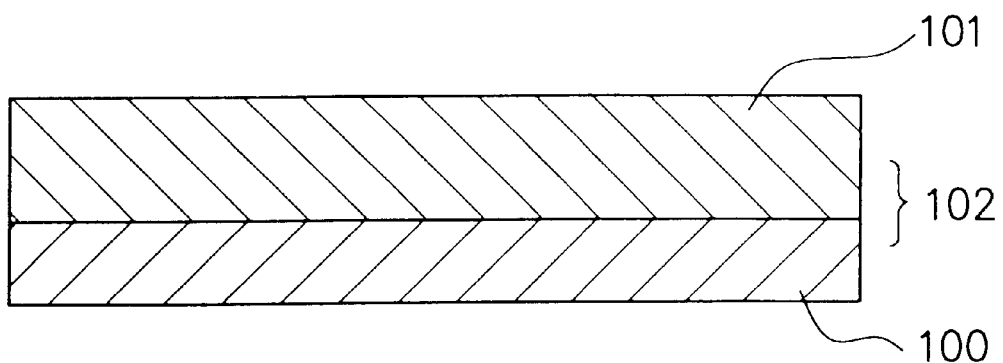
FIGS. 1(*a*) and 1(*b*) are schematic cross-sectional views respectively illustrating the structure of an example of an electrode structural body according to the present invention.

In order to solve the foregoing subjects in the prior art for rechargeable lithium batteries in which oxidation-reduction reaction of lithium in terms of electrochemical reaction is used, the present inventors made extensive studies while focusing on constituent materials of their anodes. Particularly, there were provided a variety of alloy materials which have never been used in practice as the anode of a rechargeable battery, and extensive studies were made of these alloy materials through various experiments. As a result, there were obtained findings as will be described in the following. For a rechargeable lithium battery in which oxidation-reduction reaction of lithium in terms of electrochemical reaction is used, in the case where an electrode structural body constituted by a material (that is, an electrode material) containing a particulate comprising an amorphous M·A·X alloy with a substantially non-stoichiometric ratio composition which is capable of being alloyed with lithium in the electrochemical reaction at least upon charging is used as the anode, there can be attained a rechargeable lithium battery which has a high capacity and a markedly prolonged charging and discharging cycle life which could not be achieved in the prior art. The present invention is based on this finding.

For the above formula M·A·X, M indicates at least 18 one kind of an element selected from a group consisting of Si, Ge, and Mg; A indicates at least one kind of an element selected from a group consisting of transition metal elements; X indicates at least one kind of an element selected from a group consisting of O, F, N, Ba, Sr, Ca, La, Ce, C, P, B, S, Se, Te, Bi, Sb, Al, In, and Zn, where the element X is not always necessary to be contained. The content of the constituent element M of the amorphous M·A·X alloy is M/(M+A+X)=20 to 80 atomic % in terms of the number of atoms of each element (atom) of the entire constituent elements M, A and X.

The above "amorphous alloy with a substantially non-stoichiometric ratio composition" in the present invention means an amorphous alloy in which more than two kinds of metal elements are not bonded at a simple integral ratio. That is, the "amorphous alloy with a substantially non-stoichiometric ratio composition" in the present invention is distinguished from an intermetallic compound in which more than two kinds of metal elements are bonded at a simple integral ratio. More concretely, the element composition of the "amorphous alloy" in the present invention is distinguished from that of any of known intermetallic compounds (which have a regular atomic arrangement and a crystalline structure which is quite different from that of each constituent metal), namely, it is distinguished from the composition (the stoichiometric composition) expressed by a prescribed structural formula in which more than two kinds of metal elements are bonded at a simple integral ratio.

In this way, the "amorphous alloy" in the present invention is of the composition which is quite different from the stoichiometric composition. In view of this, the "amorphous alloy" in the present invention is identified by the term "amorphous alloy with a non-stoichiometric ratio composition".

As previously described, the present invention provides an electrode material which comprises a particulate comprising an amorphous M·A·X alloy with a substantially non-stoichiometric ratio composition. The electrode material has excellent characteristics and it is extremely suitable as a constituent (that is, an anode active material) of an anode of a rechargeable lithium battery. This electrode material will be hereinafter referred to as "electrode material for an anode".

The present invention also provides an electrode structural body comprising the above-described electrode material for an anode of a rechargeable lithium battery. The electrode structural body has a high capacity and a prolonged cycle life, and it is extremely suitable for use as an anode of a rechargeable lithium battery. Particularly, in the case of using this electrode structural body as an anode of a rechargeable lithium battery, the problems of the anode in the conventional rechargeable lithium battery in that when the charging and discharging cycle is repeated over a long period of time, the anode is expanded to deteriorate its current connecting performance, and therefore, it is difficult for the charging and discharging cycle life to be prolonged as desired are desirably solved.

The present invention further provides a rechargeable lithium battery in which the above-described electrode structural body is used. Specifically, the present invention provides a rechargeable lithium battery comprising at least an anode, a cathode and an electrolyte and in which oxidation-reduction reaction of lithium is used, characterized in that said anode comprises the above-described electrode structural body. The rechargeable lithium battery provided according to the present invention has a prolonged charging and discharging cycle life and provides a gently-sloping discharge curve, and it has a high capacity and a high energy density.

Now, the transition metal element as the constituent element A of the foregoing amorphous M·A·X. alloy can include Cr, Mn, Fe, Co, Ni, Cu, Mo, Tc, Ru, Rh, Pd, Ag, Ir, Pt, Au, Ti, V, Y, Sc, Zr, Nb, Hf, Ta, and W.

The transition metal element as the constituent element A may be one or more kinds of elements selected from the elements mentioned in the above.

Specific preferable examples of the amorphous M·A·X alloy in the present invention are those as will be illustrate below.

(1) Specific preferable examples of the amorphous alloy with a composition comprising the foregoing element M which comprises Si element and the foregoing element A which comprises at least one kind of a transition metal element selected from a group consisting of Co, Ni, Fe, Cu, Mo, Cr, Ag, Zr, Ti, Nb, Y, and Mn are: Si—Co amorphous alloy, Si—Ni amorphous alloy, Si—Fe amorphous alloy, Si—Cu amorphous alloy, Si—Mo amorphous alloy, Si—Cr amorphous alloy, Si—Ag amorphous alloy, Si—Zr amorphous alloy, Si—Ti amorphous alloy, Si—Nb amorphous alloy, Si—Y amorphous alloy, Si—Ci—Ni amorphous alloy, Si—Co—Cu amorphous alloy, Si—Co—Fe amorphous alloy, Si—Co—Ag amorphous alloy, Si—Ni—Fe amorphous alloy, Si—Ni—Cu amorphous alloy, Si—Ni—Ag amorphous alloy, Si—Ni—Mo amorphous alloy, Si—Ni—Nb amorphous alloy, Si—Cu—Fe amorphous alloy, Si—Co—Fe—Ni—Cr amorphous alloy, Si—Co—Fe—Ni—Cr—Mn amorphous alloy, Si—Co—Cu—Fe—Ni—Cr amorphous alloy, Si—Co—Cu—Fe—Ni—Cr—Mn amorphous alloy, Si—Zr—Fe—Ni—Cr amorphous alloy, Si—Zr—Cu—Fe—Ni—Cr—Mn amorphous alloy, Si—Mo—Fe—Ni—Cr amorphous alloy, Si—Mo—Cu—Fe—Ni—Cr—Mn amorphous alloy, Si—Ti—Fe—Ni—Cr amorphous alloy, and Si—Ti—Cu—Fe—Ni—Cr—Mn amorphous alloy.

(2) Specific preferable examples of the amorphous alloy comprising any of the compositions described in the above (1) to which the foregoing element X which comprises at least one kind of an element selected from a group consisting C, La, Ca, Zn, Al, P, and B is added are: Si—Co—C amorphous alloy, Si—Ni—C amorphous alloy, Si—Fe—C amorphous alloy, Si—Cu—C amorphous alloy, Si—Fe—Ni—Cr—C amorphous alloy, Si—Co—Fe—Ni—Cr—C amorphous alloy, Si—Cu—Fe—Ni—Cr—C amorphous alloy, Si—Co—Fe—Ni—Cr—Mn—C amorphous alloy, Si—Co—Cu—Fe—Ni—Cr—C amorphous alloy, Si—Co—Cu—Fe—Ni—Cr—Mn—C amorphous alloy, Si—Co—La amorphous alloy, Si—Ni—La amorphous alloy, Si—Fe—La amorphous alloy, Si—Cu—La amorphous alloy, Si—Co—La—Fe—Ni—Cr amorphous alloy, Si—Cu—La—Fe—Ni—Cr amorphous alloy, Si—La—Fe—Ni—Cr amorphous alloy, Si—Co—Ca amorphous alloy, Si—Ni—Ca amorphous alloy, Si—Fe—Ca amorphous alloy, Si—Cu—Ca amorphous alloy, Si—Co—Ca—Fe—Ni—Cr amorphous alloy, Si—Cu—Ca—Fe—Ni—Cr amorphous alloy, Si—Ca—Fe—Ni—Cr amorphous alloy, Si—Co—Zn amorphous alloy, Si—Ni—Zn amorphous alloy, Si—Fe—Zn amorphous alloy, Si—Cu—Zn amorphous alloy, Si—Co—Zn—Fe—Ni—Cr amorphous alloy, Si—Cu—Zn—Fe—Ni—Cr amorphous alloy, Si—Zn—Fe—Ni—Cr amorphous alloy, Si—Co—Al amorphous alloy, Si—Ni—Al amorphous alloy, Si—Fe—Al amorphous alloy, Si—Cu—Al amorphous alloy, Si—Co—Al—Fe—Ni—Cr amorphous alloy, Si—Cu—Al—Fe—Ni—Cr amorphous alloy, Si—Al—Fe—Ni—Cr amorphous alloy, Si—Co—P amorphous alloy, Si—Ni—P amorphous alloy, Si—Fe—P amorphous alloy, Si—Cu—P amorphous alloy, Si—Co—P—Fe—Ni—Cr amorphous alloy, Si—Cu—P—Fe—Ni—Cr amorphous alloy, Si—P—Fe—Ni—Cr amorphous alloy, Si—Co—B amorphous alloy, Si—Ni—B amorphous alloy, Si—Fe—B amorphous alloy, Si—Cu—B amorphous alloy, Si—Co—B—Fe—Ni—Cr amorphous alloy, Si—Cu—B—Fe—Ni—Cr amorphous alloy, and Si—B—Fe—Ni—Cr amorphous alloy.

(3) Specific preferable examples of the amorphous alloy comprising any of the compositions described in the above (1) to which Mg element or/and Ge element are added are: Si—Co—Mg amorphous alloy, Si—Ni—Mg amorphous alloy, Si—Fe—Mg amorphous alloy, Si—Cu—Mg amorphous alloy, Si—Co—Mg—Fe—Ni—Cr amorphous alloy, Si—Cu—Mg—Fe—Ni—Cr amorphous alloy, Si—Mg—Fe—Ni—Cr amorphous alloy, Si—Co—Ge amorphous alloy, Si—Ni—Ge amorphous alloy, Si—Fe—Ge amorphous alloy, Si—Cu—Ge amorphous alloy, Si—Co—Ge—Fe—Ni—Cr amorphous alloy, Si—Cu—Ge—Fe—Ni—Cr amorphous alloy, Si—Ge—Fe—Ni—Cr amorphous alloy, Si—Ge—Mg—Co amorphous alloy, Si—Ge—Mg—Ni amorphous alloy, Si—Ge—Mg—Fe amorphous alloy, Si—Ge—Mg—Cu amorphous alloy, Si—Ge—Mg—Co—Fe—Ni—Cr amorphous alloy, Si—Ge—Mg—Cu—Fe—Ni—Cr amorphous alloy, and Si—Ge—Mg—Fe—Ni—Cr amorphous alloy.

Besides these, amorphous alloys comprising the alloy compositions described in the above (1) or (2) whose Si element is substituted by either Ge element or Mg element are also usable.

The foregoing amorphous phase-bearing alloy particulate is in a powder particulate form and which has an average particle size preferably in a range of from 0.5 $\mu$m to 20 $\mu$m, more preferably in a range of from 0.5 $\mu$m to 10 $\mu$m.

And the alloy particulate is desired to have a specific surface area of preferably more than 1 m$^2$/g, more preferably more than 5 m$^2$/g.

Further, the alloy particulate is desired to have a crystallite size calculated from a X-ray analysis therefor, which is preferably less than 500 Å, more preferably less than 200 Å, most preferably less than 100 Å.

The alloy particulate may contain oxygen element (O), fluorine element (F), or oxygen element and fluorine element as a minor amount element. In this case, the content of the oxygen element or the fluorine element or the total content of these two elements is preferably in a range of from 0.05% by weight to 5% by weight, more preferably in a range of from 0.1% by weight to 3% by weight. In this case, the alloy particulate is prevented from being oxidized.

Further, the alloy particulate may contain carbon element (C) as a minor amount element even in the case where the foregoing element X is not contained. The content of the carbon element is preferably in a range of from 0.05% by weight to 5% by weight, more preferably in a range of from 0.1% by weight to 3% by weight.

Besides, the alloy particulate may contain lithium element (Li) in an amount in a range of from 3% by weight to 30% by weight.

In the following, the present invention will be detailed with reference to the drawings.

[Electrode Structural Body]

Figure 1B:
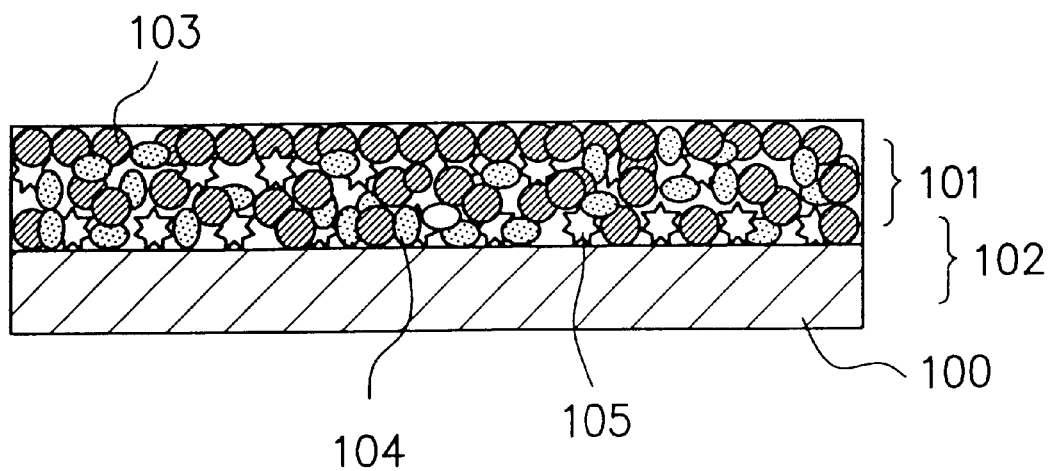

FIG. 1 (FIGS. 1(a) and 1(b)) is a schematic cross-sectional view illustrating a cross section of an electrode structural body 102 in which an amorphous phase-containing alloy particulate comprising the foregoing amorphous alloy of the present invention (this amorphous phase-containing particulate will be hereinafter referred to as "amorphous phase-bearing alloy particulate") is used. Particularly, FIG. 1(a) shows an electrode structural body 102 comprising an electrode material layer 101 in which the amorphous phase-bearing alloy particulate is used and which is provided on a collector 100. FIG. 1(b) shows an electrode structural body 102 comprising an electrode material layer provided on a collector 100, wherein the electrode material layer comprises the amorphous phase-bearing alloy particulate 103, an electrically conductive auxiliary 104, and a binder 105. In each of FIGS. 1(a) and 1(b), the electrode material layer 101 is provided only on one side of the collector 100. However, it is possible for the electrode material layer to be provided on each of the opposite faces of the collector 100.

In the present invention, the anode comprises the amorphous alloy particulate of the present invention which is capable of being alloyed with lithium as above described and because of this, the anode has gaps (microspaces) among particles of the amorphous alloy particulate, where these gaps serve to allow the amorphous alloy particulate constituting the anode to smoothly expand upon charging and therefore, the anode is prevented from suffering breakage. In addition, the amorphous alloy particulate has amorphous phase and because of this, its volume expansion upon alloying with lithium is diminished. In this connection, in the case where the amorphous alloy particulate of the present invention, which is capable of being alloyed with lithium in the electrochemical reaction, is used as the constituent of the anode of a rechargeable lithium battery as above described, expansion and shrinkage of the electrode material layer of the anode is diminished. Thus, it is possible to attain a rechargeable lithium battery having a satisfactory battery performance which is hardly deteriorated even when the charging and discharging cycle is repeated over a long period of time.

On the contrary, when the anode comprises a plate-like metal material capable of being alloyed with lithium in the electrochemical reaction, expansion of the anode upon charging is quite large, and cracking is liable to occur at the anode when charging and discharging are alternately repeated over a long period of time, where the anode is liable to suffer from breakage. Thus, it is difficult to attain a rechargeable battery having a long battery lifetime.

In the following, description will be made of examples of a process for producing the electrode structural body 102.

(1) The electrode structural body 102 shown in FIG. 1(a) may be produced, for example, by directly forming an electrode material layer 101 comprising a given amorphous phase-bearing particulate of the present invention which is capable of being alloyed with lithium in the electrochemical reaction on a collector 100 by a manner of press-forming said amorphous phase-bearing particulate on said collector.

(2) The electrode structural body shown in FIG. 1(b) may be formed by mixing a given amorphous phase-bearing particulate 103 of the present invention which is capable of being alloyed with lithium in the electrochemical reaction, a given electrically conductive auxiliary 104, and a given binder 105 to obtain a mixture, adding a given solvent to said mixture while adjusting the viscosity to obtain a paste, applying said paste on a collector 100, and drying the paste applied to form an electrode material layer 101 on the collector 100. In this case, the thickness or density of the electrode material layer 101 formed may be adjusted by means of roll press or the like.

[Collector 100]

The collector 100 serves to supply an electric current such that said electric current can be efficiently consumed for the electrode reaction upon charging and it also serves to collect an electric current generated upon discharging. Particularly in the case where the electrode structural body 100 is used as the anode of a rechargeable battery, as the constituent of the collector 100, it is desired to use a material having a high electric conductivity and which is inactive to the battery reaction. As preferable examples of such material, there can be mentioned metallic materials which are incapable of being alloyed with lithium in the electrochemical reaction. Specific examples of such metallic material are metals such as Cu, Ni, Fe, Ti, and the like, and alloys of these metals such as stainless steel. The collector 100 may be constituted by one or more of these materials.

The collector 100 is desired to be in the form of a plate shape. The plate shape in this case may be of a thickness in a practical range, and it can include a so-called "foil" configuration with a thickness of about 100 $\mu$m or less. Besides, it is possible to employ a mesh member, a sponge member, a fibrous member, a punching metal member, and a expanded metal member, respectively in the form of a plate shape.

[Electrode Material Layer]

The electrode material layer 101 is a layer comprising the foregoing amorphous phase-bearing amorphous alloy particulate of the present invention which is capable of being alloyed with lithium in the electrochemical reaction as above described. The electrode material layer 101 may be a layer constituted by the alloy particulate only or a layer constituted by a composite comprising the alloy particulate, an electrically conductive auxiliary and a binder comprising an organic polymer material. By making the alloy particulate to be the principal constituent of the electrode material layer, in the case where the electrode material layer is used in the anode of a rechargeable lithium battery, not only expansion of the electrode material layer upon charging but also cracking which is liable to occur at the electrode material layer upon the repetition of charging and discharging are restrained.

The above composite layer may be formed by mixing the amorphous alloy particulate with a given electrically conductive auxiliary and a given binder to obtain a mixture, applying said mixture on a collector, and subjecting the mixture applied to a press forming treatment. In order to make the mixture to be readily applied, it is preferred that the mixture is added with a solvent into a paste-like material prior to the application. The application of the mixture may be conducted by means of, for instance, a coater coating method or a screen printing method. Alternatively, the electrode material layer may be formed by arranging a mixture comprising the main constituent material (the amorphous alloy particulate), the electrically conductive auxiliary and the binder without adding the solvent or a mixture comprising the main constituent material and the electrically conductive auxiliary without mixing the binder on the collector and subjecting to a press forming treatment.

As the method of preparing an amorphous alloy particulate of the present invention, there can be mentioned, for example, a method (a mechanical alloying method) of directly preparing a powdery amorphous alloy by way of mechanical grinding and mixing treatment using a ball mill, particularly a planetary ball mill or a vibration mill, and a method wherein an amorphous alloy is prepared by means of a liquid quenching process such as an inert gas atomizing process or a centrifugal atomizing process, and said amorphous alloy is ground by means of a mechanical grinding apparatus to encourage the amorphization, whereby a powdery amorphous alloy is obtained.

As the preparation method of an amorphous alloy particulate, the preparation method by way of the foregoing mechanical grinding and mixing treatment is preferable in a viewpoint that an amorphous alloy particulate having an average particle size of less than 20 $\mu$m or depending upon the treatment condition adopted, of less than 5 $\mu$m can be readily prepared. Particularly, the alloying method using the mechanical grinding apparatus such as the planetary ball mill or the vibration mill is more preferable in order to prepare an amorphous alloy particulate with a non-stoichiometric composition ratio.

The mechanical grinding and mixing treatment is preferred to be conducted in an atmosphere composed of an inert gas such as argon gas or nitrogen gas. In order to prevent a product from depositing on a inner wall face of the grinding and mixing apparatus, it is possible to add an alcohol to the materials to be treated. The amount of the alcohol to be added is preferably in a range of from 1% by weight to 10% by weight, more preferably in a range of from 1% by weight to 5% by weight.

In the case where an amorphous phase-bearing alloy particulate is prepared by way of the mechanical grinding and mixing treatment using a ball mill as a representative example of the mechanical grinding and mixing apparatus, it is important to optimize the related parameters including the constituent material of the vessel and that of the balls, the size (diameter) and quantity of the balls, the amounts of raw materials, the grinding and mixing speed, and the like. The vessel and the balls are required to be constituted by a material which is highly hard and highly dense and is highly thermal conductive. As such material, there can be mentioned, for example, stainless steel, chrome steel, silicon nitride, and the like. The balls are desired to be of a size which can be readily handled. For the influences imparted by such parameters, it is considered that the momentum of the balls provides an energy necessary for the alloying, and the heat conduction and heat radiation speed of the balls and those of the inner wall of the vessel provide a cooling speed necessary for the amorphization.

As the raw materials in order to obtain a desired amorphous alloy particulate, for the elements of the formula M·A·X, it is preferred to use a prescribed raw material, for example, a powder mixture comprising a metallic powder for the element M and a metallic powder for the element A, or a powder mixture comprising a metallic powder for the element M, a metallic powder for the element A and a metallic powder for the element X.

As the binder, it is preferred to use an organic polymer material. As such organic polymer material, an organic polymer which is stable against an electrolyte solution used in a rechargeable battery is preferred. The organic polymer can include water-soluble organic polymers and water-insoluble organic polymers.

Specific examples of such water-soluble organic polymer are polyvinyl alcohol, carboxymethyl cellulose, methyl cellulose, ethyl cellulose, isopropyl cellulose, hydroxymethyl cellulose, hydroxyethyl cellulose, hydroxypropylmethyl cellulose cyanoethyl cellulose, ethyl-hydroxyethyl cellulose, starch, dextran, pullulan, polysarcosine, polyoxyethlene, polyN-vinylpyrrolidone, gum arabic, tragacanth gum, and polyvinyl acetate.

Specific examples of such water-insoluble organic polymer are fluorine-containing polymers such as polyvinylfluoride, polyvinylidenefluoride, tetrafluoroethylene polymer, trifluoroethylene polymer, difluoroethylene polymer, ethylene-tetrafluoroethylene copolymer, tetrafluoroethylene-hexafluoropropylene copolymer, tetrafluoroethylene-perfluoroalkylvinylether copolymer, and trifluoroetylenechloride polymer; polyolefins such as polyethylene and polypropylene; ethylene-propylene-diene terpolymer; silicone resin; polyvinyl chloride; and polyvinyl butyral.

The ratio occupied by the binder in the electrode material layer is desired to be preferably in a range of from 1% weight to 20% by weight or more preferably in a range of from 2% weight to 10% by weight in order to retain a large amount of an active material in the electrode material layer upon charging.

The foregoing electrically conductive auxiliary can include amorphous carbon materials such as acetylene black, ketjen black, and the like, carbonous materials such as graphite structure carbon, and the like, and metallic materials such as Ni, Cu, Ag, Ti, Pt, Al, Co, Fe, Cr, and the like. As the electrically conductive auxiliary, for example, such carbon material or metallic material as above illustrated is used preferably by blending it in an amount in a range of from 0 to 20% by weight based on the total amount of the entire constituents of the electrode material layer. The electrically conductive auxiliary is preferred to be in a spherical form, a flake form, a filament form, a fabric form, a spike form, or a needle form. In a more preferred embodiment, by adopting two kinds of forms of these forms, it is possible to increase the packing density upon forming the electrode material layer so that the resulting electrode material layer has a small impedance.

[Amorphous Alloy]

Because the foregoing amorphous alloy particulate of the present invention which is capable of being alloyed with lithium contains amorphous phase which has a short-distance order property but does not have a long-distance order property, it does not have a large change in the crystalline structure upon the alloying with lithium, and therefore, the volume expansion is small. In this connection, when the amorphous alloy particulate is used in the anode of a rechargeable lithium battery, expansion or shrinkage of the electrode material layer of the anode is quite small upon charging or discharging. Thus, there can be attained a rechargeable battery whose anode is hardly cracked or ruptured even when the charging and discharging cycle is repeated over a long period of time, where the performance thereof is maintained without being deteriorated.

Whether or not the amorphous alloy particulate contains amorphous phase or whether or not it is truly amorphous may be confirmed by the following analytical method.

In a X-ray diffraction chart of a given specimen in which a peak intensity against a diffraction angle by X-ray diffraction analysis is appeared, in the case where the specimen is crystalline, a sharp peak is appeared. However, in the case where the specimen contains amorphous phase, a broad peak with a widened half width is appeared, and in the case where the specimen is completely amorphous, no X-ray diffraction peak is appeared. Separately, according to a radial distribution function curve which is obtained by way of calculation on the basis of data obtained in the X-ray diffraction analysis of a specimen, said radial distribution function curve being of a function showing the situation that for a given atom, existential probability of other atom is present at a point being apart from said given atom at a given distance, in the case where the specimen is amorphous, being different from the case of a crystalline whose interatomic distance is constant wherein a sharp peak is appeared at every point of a definite distance, it is understood that the density at a short-distance in the vicinity of the foregoing given atom is large but it is diminished as the distance from the atom becomes distant.

According to an electron diffraction pattern obtained by electron diffraction analysis, it is understood that in the course of shifting from a spot pattern of a crystalline to an amorphous nature, there are observed changes from a ring pattern to a diffuse ring pattern, then to a halo pattern. In the case where a material has a diffuse ring pattern, it is understood that the material contains amorphous phase. In the case where a material has a halo pattern, it is understood that the material is amorphous.

According to analysis by means of a differential scanning calorimeter (DSC), for an amorphous phase-bearing metal powder, there is observed a calorific peak due to crystallization upon heating said metal powder (for instance, at a temperature in a range of from 200 to 600°C.).

As previously described, the amorphous phase-bearing alloy used in the present invention includes those two-elements series amorphous alloys, three-elements series amorphous alloys, and multi-elements series morphous alloys containing four or more different kinds of elements illustrated in the above.

In the above description relating to the formula M·A·X of the amorphous M·A·X alloy of the present invention, there is described that the constituent elements M, A and X of the amorphous M·A·X alloy have a relationship of M/(M+A+X)=20 to 80 atomic %. However, a relationship of M/(M+A+X)=30 to 70 atomic % is more preferred.

In the present invention, by using two or more kinds of metal elements which are different from each other with respect to their atomic size, which is calculated from a metallic bond radius, a van der Waals radius or the like, at an extent of preferably at least 10%, more preferably 12% or more in terms of a proportion of the difference between the main element and other element with respect to their atomic radius, amorphization is readily occurred. Further, by using three or more kinds of such metal elements, the packing density is increased and the atoms involved are prevented from being readily diffused, where there is provided a more stable amorphous state. Thus, the amorphization is more readily occurred.

In a preferred embodiment in the present invention, by incorporating an element having an small atomic size such as C, P and B or other element having an small atomic size such as O and N, it is possible that gaps among the above metal elements are diminished and the atoms involved are more prevented from being readily diffused, where there is provided a further stable amorphous state. Thus, the amorphization is further readily occurred.

In the case where the preparation of the foregoing amorphous alloy particulate is carried out in an oxygen-containing atmosphere, oxygen is incorporated and the amorphization is readily occurred. However, in the case where the amount of the oxygen incorporated exceeds 5% by weight, when the resulting amorphous alloy particulate is used as an anode material of a rechargeable lithium battery, the non-reversible amount when lithium once stored is released (that is, the lithium amount which becomes impossible to release), is increased and because of this, it is not suitable for use as the anode material.

In the present invention, for the constituent element M of the foregoing formula in the electrode material layer, it is preferred to be contained with such a concentration gradient that is decreased in the vicinity of the collector situated at a central portion of the electrode structural body and is increased on the side which contacts with an electrolyte when the electrode structural body is used as the electrode of a rechargeable battery. By this, in the case where the electrode structural body is used as the anode of a rechargeable lithium battery, occurrence of pealing at the interface between the collector and the electrode material layer due to expansion and shrinkage of the electrode material layer of the anode upon charging and discharging is prevented.

The amorphous alloy of the present invention is desired to contain Li element in an amount preferably in a range of from 3 atomic % to 30 atomic % or more preferably in a range of from 5 atomic % to 10 atomic %. By making the amorphous alloy to contain Li element in this way, in the case of a rechargeable battery having an anode prepared using this amorphous alloy, the foregoing non-reversible amount of lithium upon charging and discharging is decreased. The incorporation of Li element into the amorphous alloy may be conducted by adding, for instance, an adequate Li—Al alloy material or the like upon or after the preparation of the amorphous alloy.

Further, it is desired for the amorphous alloy of the present invention to contain, other than N as the constituent element X of the foregoing formula, at least one kind of an element selected, from a group consisting of S, Se, and Te. In the case where this amorphous alloy is used in the anode of a rechargeable lithium battery, it is possible to further prevent the electrode material layer of the anode from being expanded and shrunk upon charging and discharging. The incorporation of the above Li element or/and the above element N, S, Se, or Te into the amorphous alloy may be conducted by mixing lithium nitride, lithium sulfide, lithium selenide, or lithium telluride at the time of preparing the amorphous alloy or after the preparation thereof.

Now, in the case where the amorphous phase-bearing alloy particulate has a increased proportion of the amorphous phase, it is understood from a peak appeared in a X-ray diffraction chart that a sharp peak is appeared in the case of a crystalline, however a broad peak with a widened half width is appeared. The amorphous phase-bearing alloy particulate in the present invention is desired to have a peak appeared in a range of 2θ=20° to 50° in X-ray diffraction with Kα-rays of Cu, having a half width of preferably more than 0.20, more preferably more than 0.5°, most preferably more than 1.0°. In a preferred embodiment, it is desired to have a peak appeared in a range of 2θ=40° to 50° in X-ray diffraction with Kα-rays of Cu, having a half width of preferably more than 0.5°, more preferably more than 1°.

Particularly in the case of a rechargeable lithium battery having an anode comprising a metallic silicon material or a Si—Li alloy, it is known that a maximum of 4.4 lithium atoms can be taken-in per one Si atom, and a theoretical capacity per unit weight is 2010 Ah/Kg. Thus, it can be said that the rechargeable battery theoretically has a capacity which is greater by more than 2 times over that of 372 Ah/Kg in the case of using a graphite. However, the charging and discharging cycle life of this rechargeable battery when practically used is short. Therefore, this rechargeable battery has never put to practical use.

However, by preparing the electrode material layer comprising, for instance, a given silicon series amorphous phase-bearing alloy particulate of the present invention, it is possible to actualize such theoretically high capacity into practical one, prolong the charging and discharging cycle life, and improve other performances including discharging characteristics.

[Amorphous Phase-bearing Alloy Particulate]

The amorphous-phase bearing alloy particulate of the present invention as the principal constituent material of the electrode structural body is desired to have an average particle size controlled in a range of from 0.5 µm to 20 µm. By this, it is possible to form a layer comprising the particulate having such average particle size on the collector. In a preferred embodiment, the amorphous phase-bearing alloy particulate has an average particle size controlled in a range of from 0.5 µm to 10 µm.

[Crystallite Size]

The amorphous phase-bearing alloy particulate of the present invention in an unused state before neither charging nor discharging is operated for the electrode material layer is desired to have a crystallite size which is controlled preferably in a range of less than 500 Å, more preferably in a range of less than 200 Å, most preferably in a range of less than 100 Å. By using the alloy particulate of such minute crystallite size, the electrochemical reaction upon charging and discharging can be smoothly conducted, and the charge capacity can be greatly improved. Further, occurrence of distortion which will be occurred upon the entrance and exit of lithium can be suppressed to a minimum level, and the charging and discharging cycle life can be greatly prolonged.

Here, the above crystallite size of the alloy particulate in the present invention is one determined from the half width and diffraction angle of a peak of a X-ray diffraction curve obtained using a radiation source comprising Kα-rays of Cu and in accordance with the following Scherrer's equation.

$$Lc = 0.94\lambda/(\beta \cos \theta e) \quad \text{[Scherrer's equation]}$$

Lc: crystallite size
λ: wavelength of X-ray beam
β: half width (radian) of the peak
θ: Bragg angle of the diffraction line

[Proportion of Amorphous Phase]

By making a X-ray diffraction peak intensity obtained from a crystallized product, which is obtained by subjecting a given amorphous phase-bearing alloy particulate to a heat treatment at a temperature of more than 600°C. in an atmosphere composed of inert gas or hydrogen gas, to be a crystalline of 100% (intensity Ic), it is possible to readily obtain the proportion of the amorphous phase in the amorphous phase-bearing alloy particulate.

When the X-ray diffraction peak intensity of the amorphous phase-bearing alloy particulate is made to be Ia, the proportion of the amorphous phase is: $(1-Ia/Ic) \times 100\%$.

For the amorphous phase-bearing alloy particulate of the present invention, its proportion of the amorphous phase obtained by way of calculation in accordance with the above equation is preferably more than 30%, more preferably more than 50%.

[Preferable Specific Surface Area of Amorphous Phase-bearing Alloy Particulate]

In the case where the amorphous phase-bearing alloy particulate of the present invention is used as a constituent material of the anode of a rechargeable lithium battery, in order to increase the reactivity of the alloy particulate with lithium deposited upon charging so as to uniformly react with said lithium and also in order for the alloy particulate to be readily handled, it is desired for the alloy particulate to have a small particle size and also have a large specific surface area at an extent that the electron conductivity of the electrode formed is not decreased so as to heighten the impedance thereof and also at an extent that the electrode material layer can be readily formed. Particularly, it is desired for the alloy particulate to have a specific surface area preferably of more than 1 $m^2/g$ or more preferably of more than 5 $m^2/g$. The specific surface area can be measured by means of BET (Brunauer-Emmett-Teller) method.

[Oxidation Prevention of Amorphous Phase-bearing Alloy Particulate]

An alloy material in a powdery form is liable to react with air into an oxide material. For the amorphous phase-bearing alloy particulate of the present invention, by covering its surface by a thin oxide coat or a thin fluoride coat, it is possible to prevent the alloy particulate from being oxidized and maintain it in a stable state. To coat the alloy particulate by said thin oxide coat may be carried out by a method of preparing a prescribed amorphous phase-bearing alloy particulate and introducing a minor amount of oxygen into said alloy particulate. Besides, there can be illustrated a method wherein a prescribed amorphous phase-bearing alloy particulate is prepared in an atmosphere containing a minor amount of oxygen to obtain an oxygen-containing amorphous phase-bearing alloy particulate. In the case of incorporating oxygen element in this way, amorphization of a product is readily occurred. However, in the case where the oxygen content is beyond 5% by weight, when the amorphous phase-bearing alloy particulate is used as an anode material of a rechargeable lithium battery, the non-reversible amount (the amount of lithium which is remained without being released) when lithium is stored and the lithium stored is then released is increased. Thus, the alloy particulate in this case is not suitable for use as the anode material.

Other than the above-described methods for the oxidation prevention, it is possible to adopt a method of adding an antioxidant upon the preparation of the amorphous phase-bearing alloy particulate.

To coat the amorphous phase-bearing alloy particulate by said thin fluoride coat may be carried out by a method wherein a given amorphous phase-bearing alloy particulate is prepared and said alloy particulate is immersed in a solution containing hydrofluoric acid or a fluorine compound such as ammonium fluoride.

The alloy particulate coated by such thin oxide coat or thin fluoride coat is desired to contain the oxygen element or/and the fluorine element in an amount in a range of from 0.05% by weight to 5% by weight. In a preferred embodiment, it is desired to contain the oxygen element or/and the fluorine element in an amount in a range of from 0.1% by weight to 3% by weight. In any case, the oxygen element or the fluorine element in such minor amount is preferred contain in the alloy particulate such that either the oxygen element or the fluorine element is locally present at the surface of the alloy particulate.

The measurement of the oxygen content may be carried out by a method wherein a specimen is heated in a crucible made of graphite to convert the oxygen contained in the specimen into carbon monoxide, followed by subjecting to detection by means of a thermal conductivity detector. The measurement of the fluorine content may be carried out by a method wherein a specimen is dissolved in an acid or the like, subjecting to analysis by way of emission spectral analysis.

[Rechargeable Battery]

Figure 2:
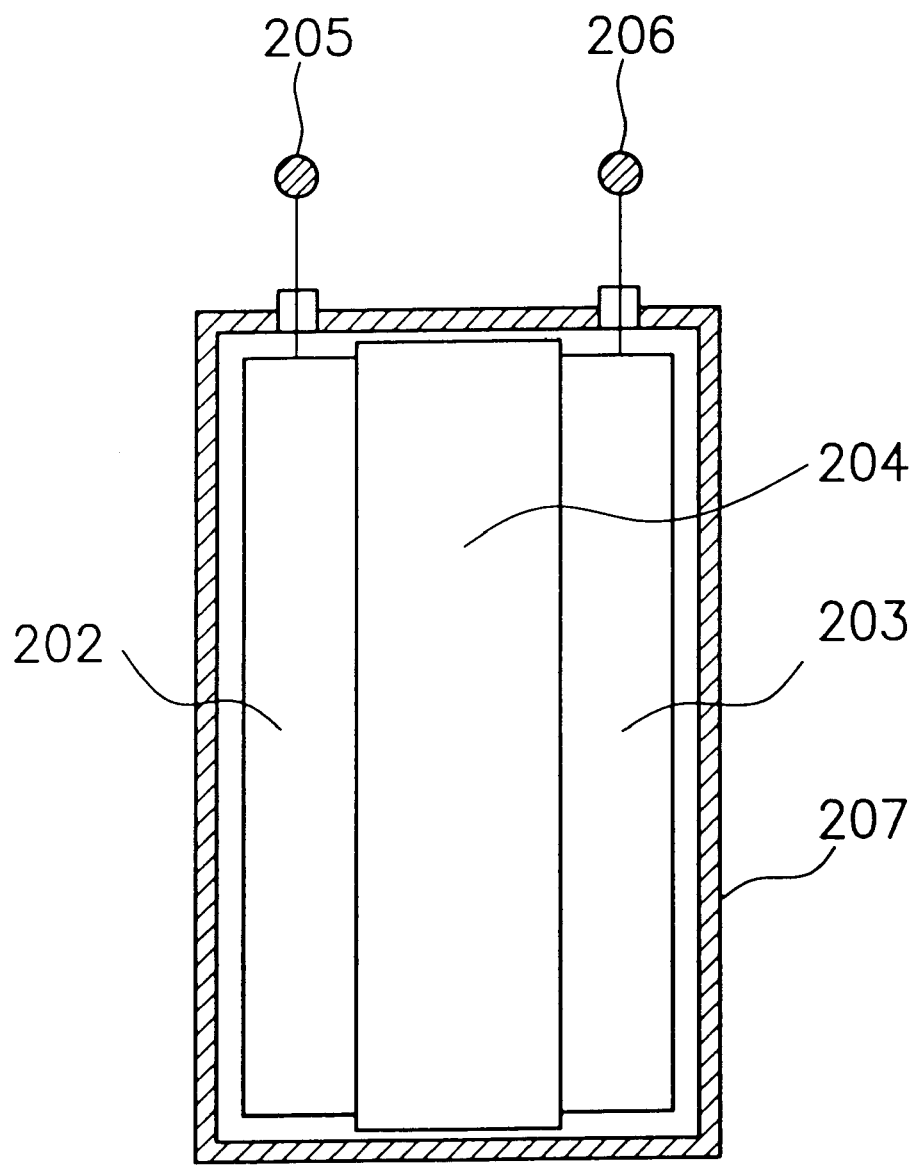
FIG. 2 is a schematic cross-sectional view illustrating a basic constitution of an example of a rechargeable battery according to the present invention.

FIG. 2 is a conceptual view schematically illustrating the constitution of a rechargeable lithium battery according to the present invention. As shown in the figure, an anode 202 comprising the foregoing electrode structural body of the present invention and a cathode 203 are accommodated in a battery housing 207 (a battery case) such that they are opposed to each other through an ion conductor 204 (an electrolyte). And an anode terminal 205 is electrically connected to the anode 202, and a cathode terminal 206 is electrically connected to the cathode 203.

In the present invention, by using an electrode structural body having such configuration as shown in FIG. 1(a) or FIG. 1(b) as the anode 202, because the anode 202 comprises a specific amorphous phase-bearing alloy particulate which is expanded a little when it is alloyed with lithium upon charging, expansion and shrinkage of the anode in the battery housing 207 are quite small even when the charging and discharging cycle is repeated over a long period of time, where the electrode material layer (which retains lithium upon charging) of the anode scarcely suffers fatigue failure. Thus, the rechargeable lithium battery has a prolonged charging and discharging cycle life. Further, in the case where the amorphous phase-bearing alloy particulate comprises an amorphous alloy particulate having amorphous phase and which has a small crystallite size, it is electrochemically alloyed with lithium in an uniform state upon charging, and the release of the lithium upon discharging is smoothly performed, where the anode exhibits good discharge characteristics.

[Anode 202]

As the anode 202 of the rechargeable lithium battery of the present invention, the constitution of any of the foregoing electrode structural bodies 102 of the present invention which have been described with reference to FIGS. 1(a) and 1(b) can be used as it is.

[Cathode 203]

The cathode 203 as a counter electrode to the anode comprising the electrode structural body of the present invention in the rechargeable lithium battery comprises at least a cathode active material capable of being a host material for lithium ion. Preferably, the cathode comprises a layer formed of said cathode active material capable of being a host material for lithium ion and a collector. The layer formed of the cathode material is preferred to comprise said cathode active material capable of being a host material for lithium ion and a binder, if necessary, also an electrically conductive auxiliary.

As the cathode active material capable of being a host material for lithium ion used in the rechargeable lithium battery, transition metal oxides, transition metal sulfides, transition metal nitrides, lithium-transition metal oxides, lithium-transition metal sulfides, and lithium-transition metal nitrides may be selectively used. Of these, lithium-transition metal oxides, lithium-transition metal sulfides, and lithium-transition metal nitrides respectively containing lithium element are preferred. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au.

It is preferred also for the cathode active material (or the cathode material) to comprise an amorphous phase-bearing material in order to increase the amount (that is, the storage capacity) of lithium ion which intercalates. As well as in the case of the amorphous phase-bearing alloy particulate constituting the anode in the above, the amorphous phase-bearing material is desired to be of a crystallite size, which is calculated from data obtained in the X-ray diffraction analysis and in accordance with the foregoing Scherrer's equation, preferably in a range of less than 500 Å or more preferably in a range of less than 200 Å. And as well as in the case of the amorphous phase-bearing alloy particulate as the anode material, it is desired to be such that in a X-ray diffraction chart (of X-ray diffraction intensity against a diffraction angle of 2θ), has a main peak with a half width preferably of more than 0.2° or more preferably of more than 0.5° respectively against 2θ.

In the case where the cathode active material is in a powdery form, a cathode active material layer is formed by mixing said powder cathode active material with a binder and applying the mixture on the collector or by sintering said powder cathode active material on the collector, whereby forming the cathode. In the case where the conductivity of the powder cathode active material is insufficient, as well as in the case of forming the electrode material layer (as the anode active material layer) for the foregoing electrode structural body (102), an adequate electrically conductive auxiliary is added. As said binder and said electrically conductive auxiliary, those mentioned in the above which are used for the formation of the electrode structural body (102) of the present invention may be used.

The collector of the cathode may be constituted by a metal such as Al, Ti, Pt, or Ni, or an alloy such as stainless steel.

[Ion Conductor 204]

As the ion conductor used in the rechargeable lithium battery of the present invention, there may be used a separator having an electrolyte solution (a supporting electrolyte solution obtained by dissolving a given supporting electrolyte in an adequate solvent) retained therein, a solid electrolyte, or a solidified electrolyte obtained by gelling an adequate electrolyte solution by a polymer gelling agent.

The ion conductor used in the rechargeable lithium battery of the present invention is necessary to have an ionic conductivity at 25° C. which is preferably more than $1 \times 10^{-3}$ S/cm or more preferably more than $5 \times 10^{-3}$ S/cm.

The supporting electrolyte can include inorganic acids such as $H_2SO_4$, HCl and $HNO_3$; salts of $Li^+$ (lithium ion) with Lewis acid ion such as $BF_4^-$, $PF_6^-$, $AsF_6^-$, $ClO_4^-$, $CF_3SO_3^-$, or $BPh_4^-$ (with Ph being a phenyl group); and mixtures of these salts. Besides these, salts of the above described Lewis acids ions with cations such as sodium ion, potassium ion, tetraalkylammonium ion, or the like are also usable.

In any case, it is desired that the above salts are used after they are subjected to dehydration and deoxygenation, for example, by way of heat treatment under reduced pressure.

The solvent in which the supporting electrolyte is dissolved can include acetonitrile, benzonitrile, propylene carbonate, ethylene carbonate, dimethyl carbonate, diethyl carbonate, dimethylformamide, tetrahydrofuran, nitrobenzene, dichloroethane, diethoxyethane, 1,2-dimethoxyethane, chlorobenzene, γ-butyrolactone, dioxolan, sulfolan, nitromethane, dimethyl sulfide, dimethyl sufoxide, methyl formate, 3-methyl-2-oxdazolydinone, 2-methyltetrahydrofuran, 3-propylsydonone, sulfur dioxide, phosphoryl chloride, thionyl chloride, sulfuly chloride, and mixtures of these.

As for these solvents, it is desired for them to be subjected to dehydration using activated alumina, molecular sieve, phosphorous pentaoxide, or calcium chloride, prior to their use. Depending upon some of these solvents, it is desired for them to be subjected to distillation in an atmosphere composed of inert gas in the presence of an alkali metal, where moisture and foreign matter are removed.

In order to prevent leakage of the electrolyte solution, it is desired to use a solid electrolyte or solidified electrolyte.

The solid electrolyte can include a glass material such as an oxide material comprising lithium, silicon, phosphorus, and oxygen elements, a polymer chelate comprising an organic polymer having an ether structure, and the like.

The solidified electrolyte can include those obtained by gelling a given electrolyte solution by a gelling agent to solidify said electrolyte solution. As the gelling agent, it is desired to use a polymer having a property of absorbing the solvent of the electrolyte solution to swell or a porous material such as silicagel, capable of absorbing a large amount of liquid. Said polymer can include polyethylene oxide, polyvinyl alcohol, polyacrylamide, polymethylmethacrylate, and polyacrylonitrile. Of these, polymers having a cross-linking structure are preferable.

The separator is disposed between the anode and the cathode, and it serves to prevent the anode and the cathode from suffering from internal-shorts. It also serves to retain an electrolyte therein depending upon the situation. The separator having the electrolyte retained therein functions as the ion conductor.

The separator is required to have a structure having a number of perforations capable of allowing lithium ion to pass therethrough and it is also required to be insoluble into and stable to the electrolyte solution. The separator may be constituted by a nonwoven fabric or a memberane having a micropore structure, made of glass, a polyolefin such as polypropylene, polyethylene or the like, or a fluororesin. Alternatively, the separator may be constituted by a metal oxide film or a resin film combined with a metal oxide, respectively having a plurality of micropores. In a preferred embodiment, the separator is constituted by a multilayered metal oxide film. In this case, the separator effectively prevents a dendrite from passing therethrough and because of this, occurrence of internal-shorts between the anode and the cathode is desirably prevented. Besides, the separator may be constituted by an incombustible material such as a fluororesin film, a glass member or a metal oxide film. In this case, the safety can be more improved.

[Shape and Structure of Rechargeable Battery]

The rechargeable battery of the present invention may be in the form of a flat round shape, a cylindrical shape, a prismatic shape, or a sheet-like shape. The structure of the rechargeable battery of the present invention may takes a single layer structure, a spiral-wound cylindrical structure, or the like. In the case where the rechargeable battery is of a spiral-wound cylindrical structure, the anode, separator, and cathode are arranged in the named order and they are spiral-wound and because of this, there are advantages such that the battery area can be increased as desired and a high electric current can be flown upon charging and discharging. In the case where the rechargeable battery is of a prismatic structure or a sheet-like structure, there is an advantage in that the space of a device for housing the rechargeable battery can be effectively utilized. In the following, the shape and structure of a rechargeable battery of the present invention will be detailed with reference to FIGS. 3 and 4.

Figure 3:
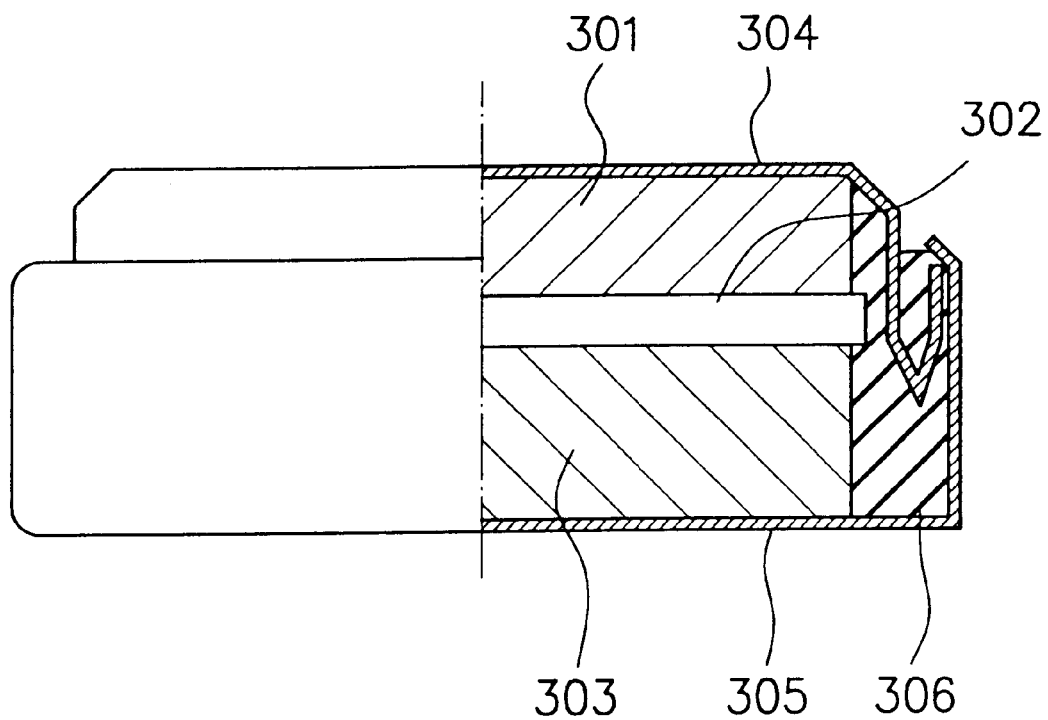
FIG. 3 is a schematic cross-sectional view illustrating an example of a single-layer structure type flat battery according to the present invention.
Figure 4:
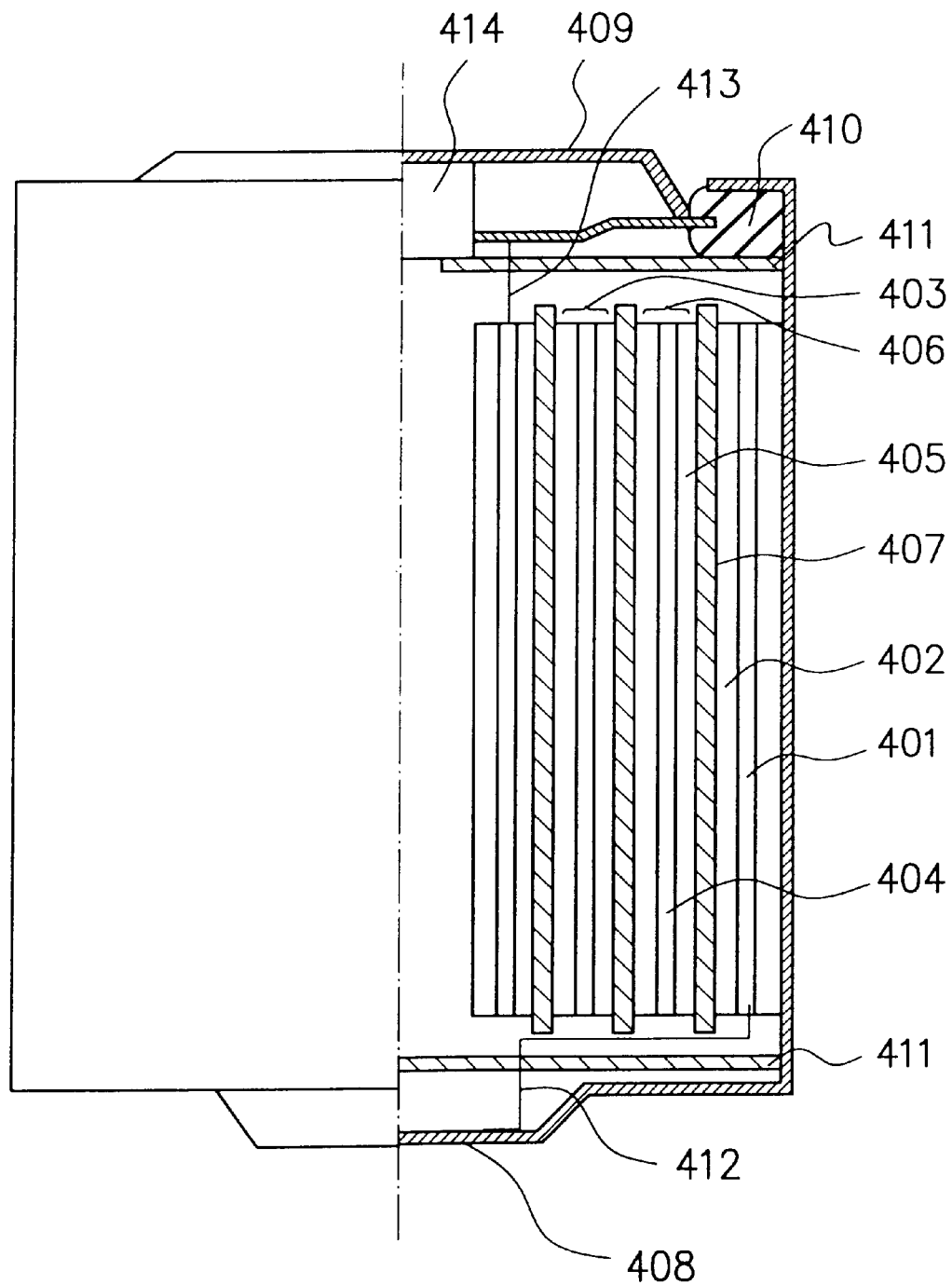
FIG. 4 is a schematic cross-sectional view illustrating an example of a spiral-wound cylindrical battery according to the present invention.

FIG. 3 is a schematic cross-sectional view illustrating an example of a single-layer flat round type (coin type) rechargeable battery according to the present invention. FIG. 4 is a schematic cross-sectional view illustrating an example of a spiral-wound cylindrical type rechargeable battery according to the present invention.

In FIGS. 3 and 4, each, of reference numerals 301 and 403 indicates an anode, each of reference numerals 303 and 406 a cathode, each of reference numerals 304 and 408 an anode terminal (an anode cap or an anode can), each of reference numerals 305 and. 409 a cathode terminal (a cathode can or a cathode cap), each of reference numerals 302 and 407 an ion conductor, each of reference numerals 306 and 410 a gasket, reference numeral 401 an anode collector, reference numeral 404 a cathode collector, reference numeral 411 an insulating plate, reference numeral 412 an anode lead, reference numeral 413 a cathode lead, and reference numeral 414 a safety vent.

In the flat round type (coin type) rechargeable battery shown in FIG. 3, the cathode 303 having a cathode material (active material) layer and the anode 301 having an anode material (active material) layer are stacked through the ion conductor 302 comprising a separator having at least an electrolyte solution retained therein to form a stacked body, and this stacked body is accommodated in the cathode can 305 as the cathode terminal from the cathode side, where the anode side is covered by the anode cap 304 as the anode terminal. And the gasket 306 is disposed in the remaining space of the cathode can.

In the spiral-wound cylindrical type rechargeable battery shown in FIG. 4, the cathode 406 having a cathode material (active material) layer 405 formed on the cathode collector 404 and the anode 403 having an anode material (active material) layer 402 formed on the anode collector 401 are opposed to each other through the ion conductor 407 comprising a separator having at least an electrolyte solution retained therein, and wound in multiple to form a stacked body having a multi-wound cylindrical structure. The stacked body having the cylindrical structure is accommodated in the anode can 408 as the anode terminal. The cathode cap 409 as the cathode terminal is provided on the opening side of the anode can 408, and the gasket 410 is disposed in the remaining space of the anode can. The electrode stacked body of the cylindrical structure is isolated from the cathode cap side through the insulating plate 411. The cathode 406 is electrically connected to the cathode cap 409 through the cathode lead 413. The anode 403 is electrically connected to the anode can 408 through the anode lead 412. The safety vent 414 for adjusting the internal pressure of the battery is provided on the cathode cap side.

In the above, each of the active material layer of the anode 301 and the active material layer 402 of the anode 403 comprises a layer comprising the foregoing amorphous alloy particulate of the present invention.

In the following, description will be made of an example of a process for fabricating a rechargeable battery having such configuration as shown in FIG. 3 or FIG. 4.

(1) A combination comprising the separator (302, 407) interposed between the anode (301, 403) and the cathode (303, 406) is positioned in the cathode can (305) or the anode can (408).

(2) The electrolyte is introduced thereinto, and the resultant is assembled with the anode cap (304) or the cathode cap (409) and the gasket (306, 410).

(3) The assembled body obtained in the step (2) is subjected to a caulking treatment, whereby the rechargeable battery is completed.

In the battery production, the preparation of the materials of the rechargeable lithium battery and the assembly of the battery are desired to be conducted in a dry air atmosphere whose moisture having been sufficiently removed or in a dry inert gas atmosphere.

Description will be made of the members used in the fabrication of the above rechargeable battery.

[Insulating Packing]

The gasket (306, 410) may be constituted by a fluororesin, a polyamide resin, a polyolefin resin, a polysulfone resin, or a rubber material. The sealing of the battery may be conducted by way of glass-sealing, sealing using an adhesive, welding or soldering, besides the caulking using the insulating packing shown in the case shown in FIG. 3 or FIG. 4.

The insulating plate shown in FIG. 4 may be constituted by a material selected from organic resin materials and ceramics.

[Battery Housing]

The battery housing comprises the cathode can or the anode can (305, 408), and the anode cap or the cathode cap (304, 409). Such battery housing preferably comprises a stainless steel sheet. Besides, it may comprise a titanium clad stainless steel sheet, a copper clad stainless steel sheet or a nickel plating steel sheet. In the case of FIG. 3, the cathode can (305) also functions as the battery housing, and in the case of FIG. 4, the anode can (408) also functions as the battery housing, and therefore, the battery housing in each case is desired to comprise a stainless steel. However, in the case where neither the cathode can nor the anode can also functions as the battery housing, a battery housing comprising said stainless steel, a metallic material of iron or zinc, a plastic material of polypropylene or the like, or a composite material comprising a metallic material or a glass fiber and a plastic material may be used.

[Safety Vent]

In the rechargeable battery, a safety vent may be provided in order to ensure the safety when the internal pressure in the battery is increased. The safety vent may comprise a rubber, a spring, a metal ball or a rupture foil.

In the following, the present invention will be described in more detail with reference to examples. However, the scope of the present invention is not restricted to these examples.

REFERENCE EXAMPLE 1

Preparation Reference Example 1 of an Alloy Powder as an Anode Material

Figure 5:
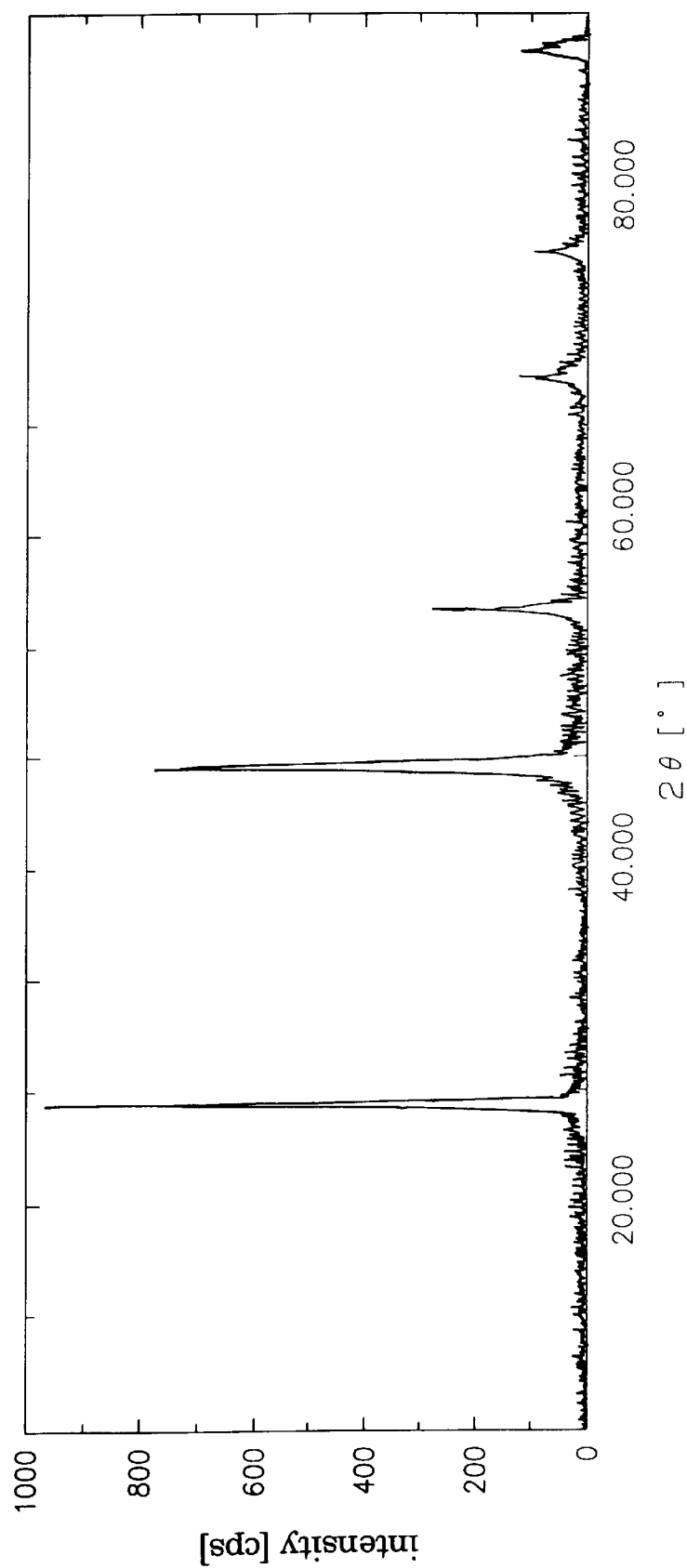
FIG. 5 shows a XRD diffraction chart for an alloy powder prepared by an atomizing method in Reference Example 1 which will be later described.

A powdery Si material having an average particle size of 3 $\mu$m and a powdery Ni material having an average particle size of 1 $\mu$m were mixed at an elemental ratio of 79.5:20.5 to obtain a mixture. The mixture was fused in an argon gas atmosphere, and treated by an gas atomizing method to obtain an alloy powder having an average particle size of 7 $\mu$m. For the resultant alloy powder, using a X-ray diffraction apparatus RINT 2000 (produced by Kabushiki Kaisha Rikagaku), wide angle X-ray diffraction analysis using K$\alpha$-rays of Cu as a radiation source was conducted. As a result, there was obtained a X-ray diffraction chart shown in FIG. 5. Reference Preparation Example 1 of an Electrode Structural Body 91% by weight of the alloy powder obtained in the above alloy powder preparation reference example 1, 4% by weight of a graphite power as an electrically conductive auxiliary, 2% by weight of carboxymethyl cellulose and 3% by weight of polyvinyl alcohol as a binder, and ion exchanged water as a solvent were mixed and stirred to obtain a paste-like product. The paste-like product was applied on each of opposite sides of a copper foil having a thickness of 18 $\mu$m as a collector, followed by drying at 80° C. under reduced pressure. The resultant was subjected to press-forming by means of a roll pressing machine. Thus, there was obtained an electrode structural body having a 40 $\mu$m thick electrode material layer with a density of about 2.6 g/cc formed on each of the opposite sides.

Preparation Reference Example 1 of a Rechargeable Battery

In this example, there was prepared a rechargeable lithium battery of an AA-size [13.9 mm (diameter)×50 mm (height)], having such configuration shown in FIG. 4.

In the following, description will be made of procedures of preparing respective constituent members of the battery, starting from the preparation of an anode, while referring to FIG. 4.

1. Preparation of Anode 403

The electrode structural body obtained in the above reference preparation example of the electrode structural body was cut to have a prescribed size. To the collector of the electrode structural body, a lead comprising a nickel foil tub was connected by way of spot-welding. Thus, there was obtained an anode 403.

2. Preparation of Cathode 406

(1). Lithium acetate and manganese nitrate were mixed at a mol ratio of 1:2 to obtain a mixture. The mixture was dissolved in an ion-exchanged water. The solution was subjected to decomposition reaction in an air stream maintained at 350° C. Thus, there was obtained a Li—Mg oxide material in a fine powder form.

(2). The Li-Mn oxide material obtained in the above (1) was subjected heat treatment in an air stream maintained at 700°C.

(3). The Li-Mn oxide material thus treated in the above (2) was mixed with 3 wt. % (% by weight) of a powdery carbonous material of acetylene black and 5 wt. % of a powdery polyvinylidene fluoride to obtain a mixture. The mixture was added with N-methyl-2-pyrroidone to obtain a paste.

(4). The paste obtained in the above (3) was applied on each of opposite sides of an aluminum foil as a collector 404, followed by drying. The resultant was subjected to press-forming by means of a roll pressing machine, whereby the thickness of each of the cathode active material layers formed on the collector was adjusted to be 90 $\mu$m. Then, a lead comprising an aluminum foil tub to the collector by means of an ultrasonic welding machine, and dried at 150° C. under reduced pressure. Thus, there was obtained a cathode 406.

3. Preparation of an Electrolyte Solution (1). Ethylene carbonate (EC) whose moisture having been sufficiently removed and dimethyl carbonate (DMC) whose moisture having been sufficiently removed were mixed at an equivalent mixing ratio, to obtain a solvent.

(2). 1 M (mol/l) of lithium tetrafluoroborate ($LiBF_4$) was dissolved in the solvent obtained in the above (1) to obtain an electrolyte solution.

4. Provision of Separator 407

As the separator, there was provided a separator comprising a 25 $\mu$m thick polyethylene member having a number of micropores.

5. Fabrication of a Rechargeable Battery

The fabrication of a rechargeable battery was conducted in a dry atmosphere controlled with respect to moisture with a dew point of less than −50° C.

(1). The separator was sandwiched between the anode and the cathode such that the separator was partly protruded at each end side, followed by spirally winding about a given axis so as to form a structure of the separator/the cathode/the separator/the anode/the separator. The resultant was inserted in an anode can 408 made of a titanium clad stainless steel.

(2). The anode lead 412 was spot-welded to a bottom portion of the anode can 408. Then, a necking was formed at an upper portion of the anode can by means of a necking apparatus, and the cathode lead 413 was welded to the cathode cap 409 provided with a gasket 410 made of polypropylene by means of an ultrasonic welding machine.

(3). The electrolyte solution was introduced into the resultant obtained in the above (2), followed by putting the cathode cap 409 thereon, and the cathode cap 409 and the anode can 408 were caulked by a caulking machine to seal the inside. Thus, there was prepared a rechargeable lithium battery.

This rechargeable battery was made to be of an anode capacity-controlled type in that the cathode capacity was made to be larger than the anode capacity.

EXAMPLE 1

Preparation Example 1 of an Alloy Powder as an Anode Material 5 g of a Si—Ni alloy powder prepared in the same manner as in the alloy powder preparation reference example 1 and 12 rigid balls made of a stainless steel and having a diameter of 15 mm were introduced into a vessel with a volume of 45 cc made of a stainless steel (comprising 85.3%Fe-18%Cr-9%Ni-2%Mn-1%Si-0.15%S-0.07%C) provided in a planetary type ball mill P-5 (produced by Fritch Company of Germany), where the inside atmosphere of the vessel was substituted by argon gas and the vessel was closed, and the grinding treatment by the planetary ball mill was conducted at an acceleration of 17 G for 2 hours. Thus, there was obtained a Si—Ni amorphous alloy powder.

Figure 6:
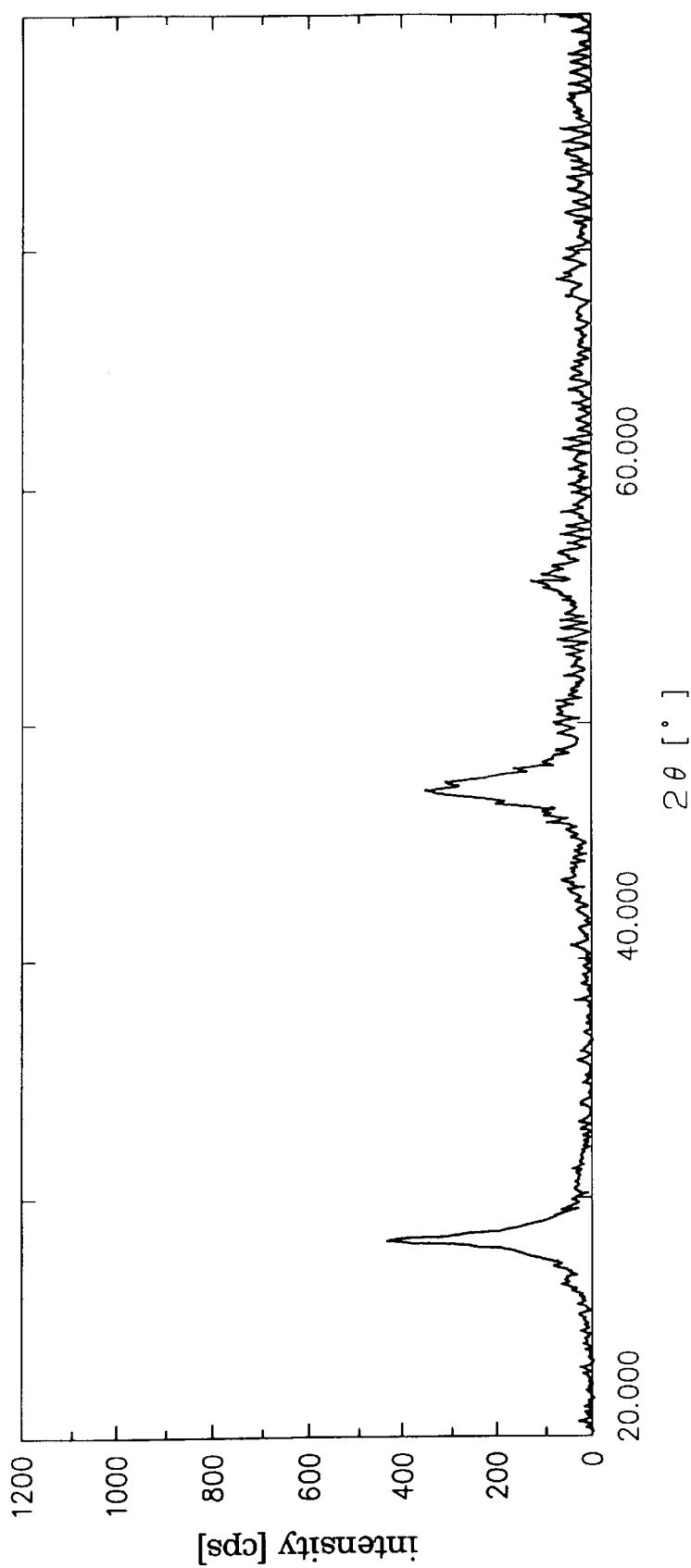
FIG. 6 shows a XRD diffraction chart for an metallic power after the treatment by a planetary ball mill in Example 1 which will be later described.

For the resultant alloy powder, wide angle X-ray diffraction analysis using K$\alpha$-rays of Cu as a radiation source was conducted. As a result, there was obtained a X-ray diffraction chart after the planetary ball mill treatment shown in FIG. 6. It is understood that peaks having a widened half width were appeared by the planetary ball mill treatment.

Preparation Example 1 of an Electrode Structural Body

In the same manner as in the preparation reference example 1 of the electrode structural body except for using the amorphous alloy powder obtained in the above preparation example 1 instead of the alloy powder obtained in the preparation reference example 1 of the alloy powder, there was prepared an electrode structural body of this example.

Preparation Example 1 of a Rechargeable Battery

In the same manner as in the preparation reference example 1 of the rechargeable battery except for using the electrode structural body obtained in the preparation example 1 of the electrode structural body instead of the electrode structural body obtained in the preparation reference example 1 of the electrode structural body, there was prepared a rechargeable battery of this example.

EXAMPLE 2

Preparation Example 2 of an Alloy Powder as an Anode Material

A Si—Ni alloy powder prepared in the same manner as in the alloy powder preparation reference example 1 and a powdery Ni material having an average particle size of 0.5 $\mu$m were mixed so that the elemental ratio of Si:Ni after the mixing became 76:24. The resultant mixture was subjected to grinding and mixing treatment by the foregoing planetary type ball mill at an acceleration of 17 G for 2 hours. Thus, there was obtained a Si—Ni amorphous alloy powder.

Figure 7:
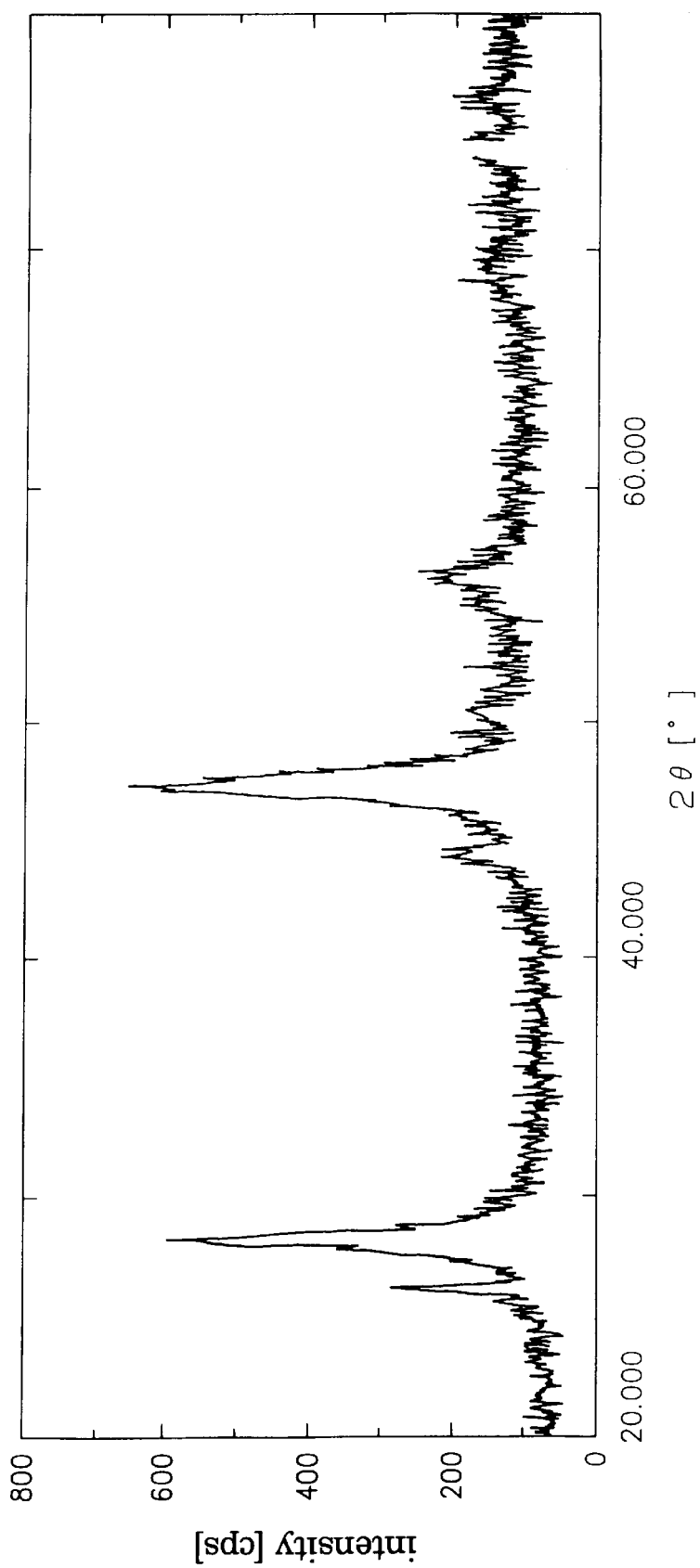
FIG. 7 shows a XRD diffraction chart for an metallic power after the treatment by a planetary ball mill in Example 2 which will be later described.

For the resultant alloy powder, wide angle X-ray diffraction analysis using K$\alpha$-rays of Cu as a radiation source was conducted. As a result, there was obtained a X-ray diffraction chart after the planetary ball mill treatment shown in FIG. 7. It is understood that peaks having a widened half width were appeared by the planetary ball mill treatment.

Separately, using a HORIBA laser scattering particle size distribution analyzer LA-920 (produced by Kabusiki Kaisha Horiba Seisakusho), for the resultant alloy powder, its particle size distribution was analyzed by dispersing a sample of the alloy powder in water by way of ultrasonic irradiation. As a result, the alloy powder was found to have an average particle size of 2.0 µm.

Preparation Example 2 of an Electrode Structural Body

In the same manner as in the preparation reference example 1 of the electrode structural body except for using the amorphous alloy powder obtained in the above preparation example 2 instead of the alloy powder obtained in the preparation reference example 1 of the alloy powder, there was prepared an electrode structural body of this example.

Preparation Example 2 of a Rechargeable Battery

In the same manner as in the preparation reference example 1 of the rechargeable battery except for using the electrode structural body obtained in the preparation example 2 of the electrode structural body instead of the electrode structural body obtained in the preparation reference example 1 of the electrode structural body, there was prepared a rechargeable battery of this example.

EXAMPLE 3

Preparation Example 3 of an Alloy Powder as an Anode Material

A powdery Si material having an average particle size of 2 µm and a powdery Ni material having an average particle size of 0.5 µm were mixed at an elemental ratio of 50:50 to obtain a mixture. The resultant mixture was subjected to grinding and mixing treatment by the foregoing planetary type ball mill at an acceleration of 17 G for 2 hours. Thus, there was obtained a Si—Ni amorphous alloy powder.

Figure 8:
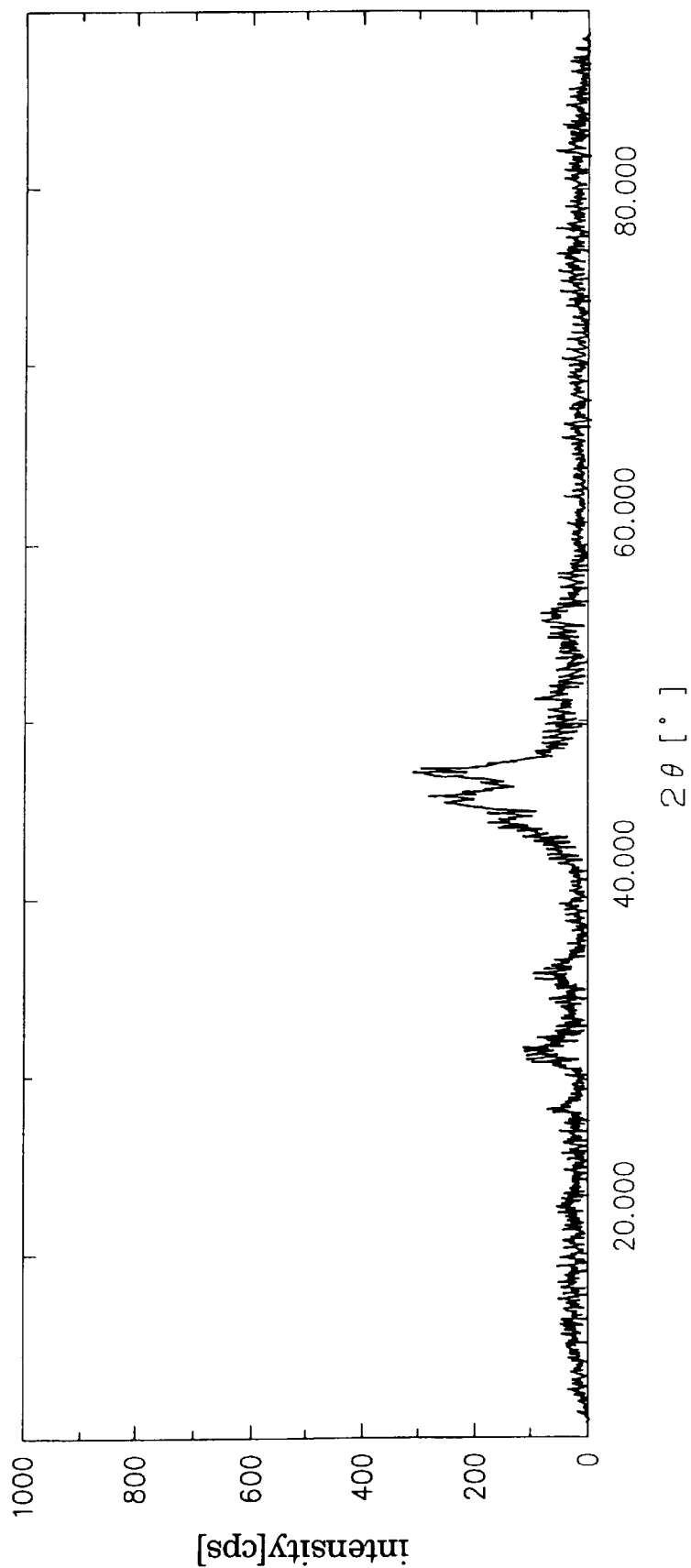
FIG. 8 shows a XRD diffraction chart for an metallic power after the treatment by a planetary ball mill in Example 3 which will be later described.

For the resultant alloy powder, wide angle X-ray diffraction analysis using Kα-rays of Cu as a radiation source was conducted. As a result, there was obtained a X-ray diffraction chart after the planetary ball mill treatment shown in FIG. 8. It is understood that peaks having a widened half width were appeared by the planetary ball mill treatment.

And the resultant alloy powder was found to have an average particle size of 2.2 µm.

Preparation Example 3 of an Electrode Structural Body

In the same manner as in the preparation reference example 1 of the electrode structural body except for using the amorphous alloy powder obtained in the above preparation example 3 instead of the alloy powder obtained in the preparation reference example 1 of the alloy powder, there was prepared an electrode structural body of this example.

Preparation Example 3 of a Rechargeable Battery

In the same manner as in the preparation reference example 1 of the rechargeable battery except for using the electrode structural body obtained in the preparation example 3 of the electrode structural body instead of the electrode structural body obtained in the preparation reference example 1 of the electrode structural body, there was prepared a rechargeable battery of this example.

REFERENCE EXAMPLE 2

Preparation Reference Example 2 of an Alloy Powder as an Anode Material

A powdery Si material having an average particle size of 2 µm and a powdery Ni material having an average particle size of 0.5 µm were mixed at an elemental ratio of 1:2 to obtain a mixture. The mixture was fused in an argon gas atmosphere, and treated by an gas atomizing method to obtain an alloy powder having an average particle size of 7 µm. For the resultant alloy powder, wide angle X-ray diffraction analysis using Kα-rays of Cu as a radiation source was conducted.

Preparation Reference Example 2 of an Electrode Structural Body

In the same manner as in the preparation reference example 1 of the electrode structural body except for using the alloy powder obtained in the above preparation reference example 2 instead of the alloy powder obtained in the preparation reference example 1 of the alloy powder, there was prepared an electrode structural body.

Preparation Reference Example 2 of a Rechargeable Battery

In the same manner as in the preparation reference example 1 of the rechargeable battery except for using the electrode structural body obtained in the preparation reference example 2 of the electrode structural body instead of the electrode structural body obtained in the preparation reference example 1 of the electrode structural body, there was prepared a rechargeable battery.

EXAMPLE 4

Preparation Example 4 of an Alloy Powder as an Anode Material

A powdery Si material having an average particle size of 2 µm and a powdery Ni material having an average particle size of 0.5 µm were mixed at an elemental ratio of 32.3:67.7 to obtain a mixture. The resultant mixture was subjected to grinding and mixing treatment by the foregoing planetary type ball mill at an acceleration of 17 G for 2 hours. Thus, there was obtained a Si—Ni amorphous alloy powder.

Figure 9:
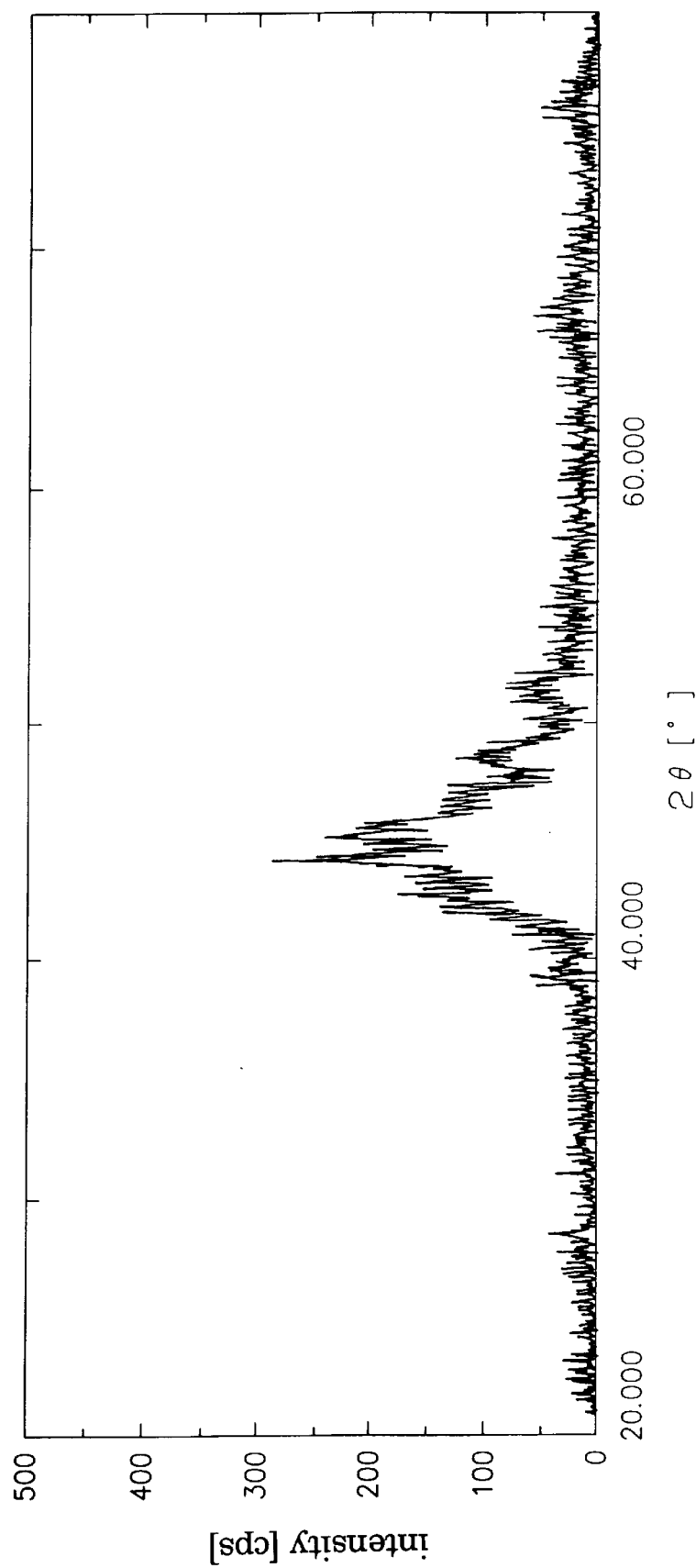
FIG. 9 shows a XRD diffraction chart for an metallic power after the treatment by a planetary ball mill in Example 4 which will be later described.

For the resultant alloy powder, wide angle X-ray diffraction analysis using Kα-rays of Cu as a radiation source was conducted. As a result, there was obtained a X-ray diffraction chart after the planetary ball mill treatment shown in FIG. 9.

Preparation Example 4 of an Electrode Structural Body

In the same manner as in the preparation reference example 1 of the electrode structural body except for using the amorphous alloy powder obtained in the above preparation example 4 instead of the alloy powder obtained in the preparation reference example 1 of the alloy powder, there was prepared an electrode structural body of this example.

Preparation Example 4 of a Rechargeable Battery

In the same manner as in the preparation reference example 1 of the rechargeable battery except for using the electrode structural body obtained in the preparation example 4 of the electrode structural body instead of the electrode structural body obtained in the preparation reference example 1 of the electrode structural body, there was prepared a rechargeable battery of this example.

EXAMPLE 5

Preparation Example 5 of an Alloy Powder as an Anode Material

A powdery Si material having an average particle size of 2 μm, a powdery Ni material having an average particle size of 0.5 μm and a powdery graphite material having an average particle size of 2 μm were mixed at an elemental ratio of 70:30:10 to obtain a mixture. The resultant mixture was subjected to grinding and mixing treatment by the foregoing planetary type ball mill at an acceleration of 17 G for 2 hours. Thus, there was obtained a Si—Ni—C amorphous alloy powder.

Figure 10:
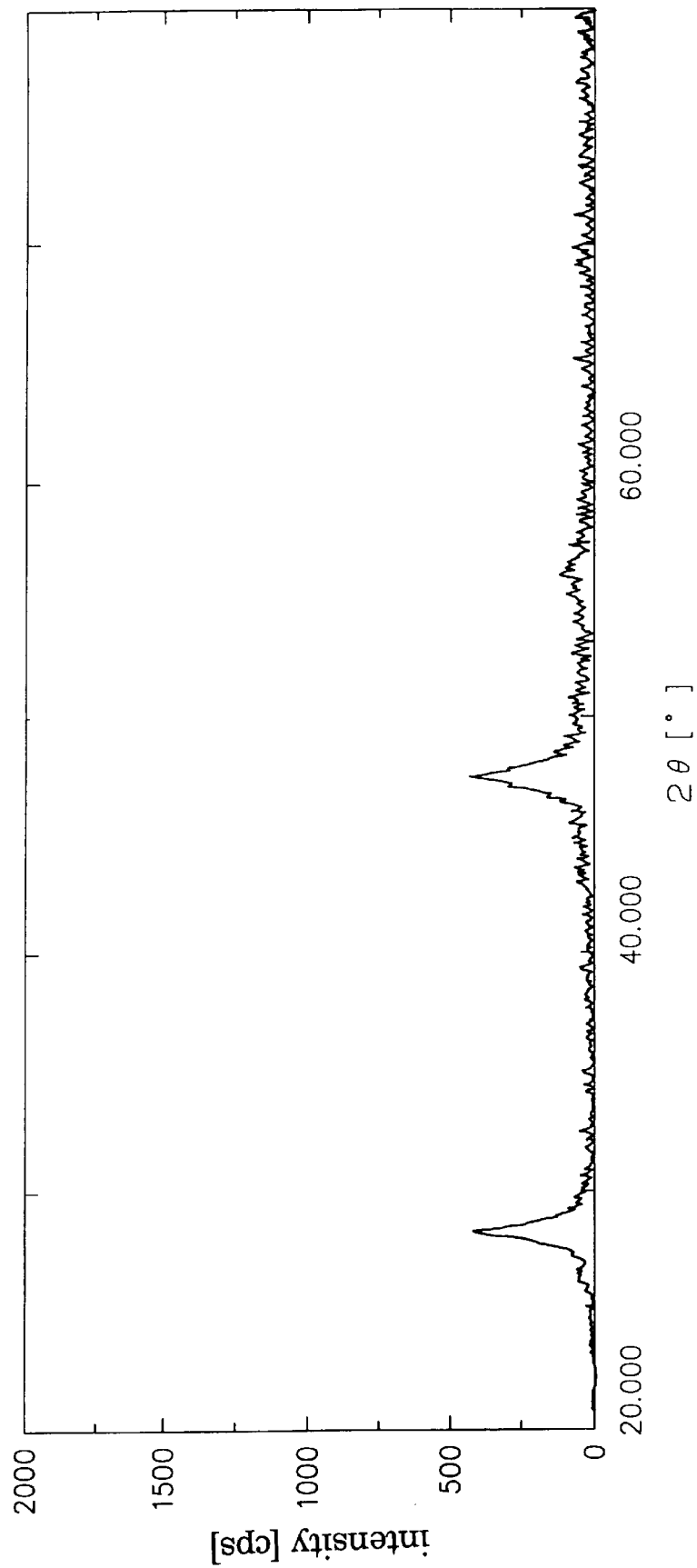
FIG. 10 shows a XRD diffraction chart for an metallic power after the treatment by a planetary ball mill in Example 5 which will be later described.

For the resultant alloy powder, wide angle X-ray diffraction analysis using Kα-rays of Cu as a radiation source was conducted. As a result, there was obtained a X-ray diffraction chart after the planetary ball mill treatment shown in FIG. 10.

Preparation Example 5 of an Electrode Structural Body

In the same manner as in the preparation reference example 1 of the electrode structural body except for using the amorphous alloy powder obtained in the above preparation example 5 instead of the alloy powder obtained in the preparation reference example 1 of the alloy powder, there was prepared an electrode structural body of this example.

Preparation Example 5 of a Rechargeable Battery

In the same manner as in the preparation reference example 1 of the rechargeable battery except for using the electrode structural body obtained in the preparation example 5 of the electrode structural body instead of the electrode structural body obtained in the preparation reference example 1 of the electrode structural body, there was prepared a rechargeable battery of this example.

EXAMPLE 6

Preparation Example 6 of an Alloy Powder as an Anode Material

A powdery Si material having an average particle size of 2 μm, a powdery Ni material having an average particle size of 0.5 μm and a powdery Ag material having an average particle size of 2 μm were mixed at an elemental ratio of 45.5:55.5:9.0 to obtain a mixture. The resultant mixture was subjected to grinding and mixing treatment by the foregoing planetary type ball mill at an acceleration of 17 G for 2 hours. Thus, there was obtained a Si—Ni—Ag amorphous alloy powder.

Figure 11:
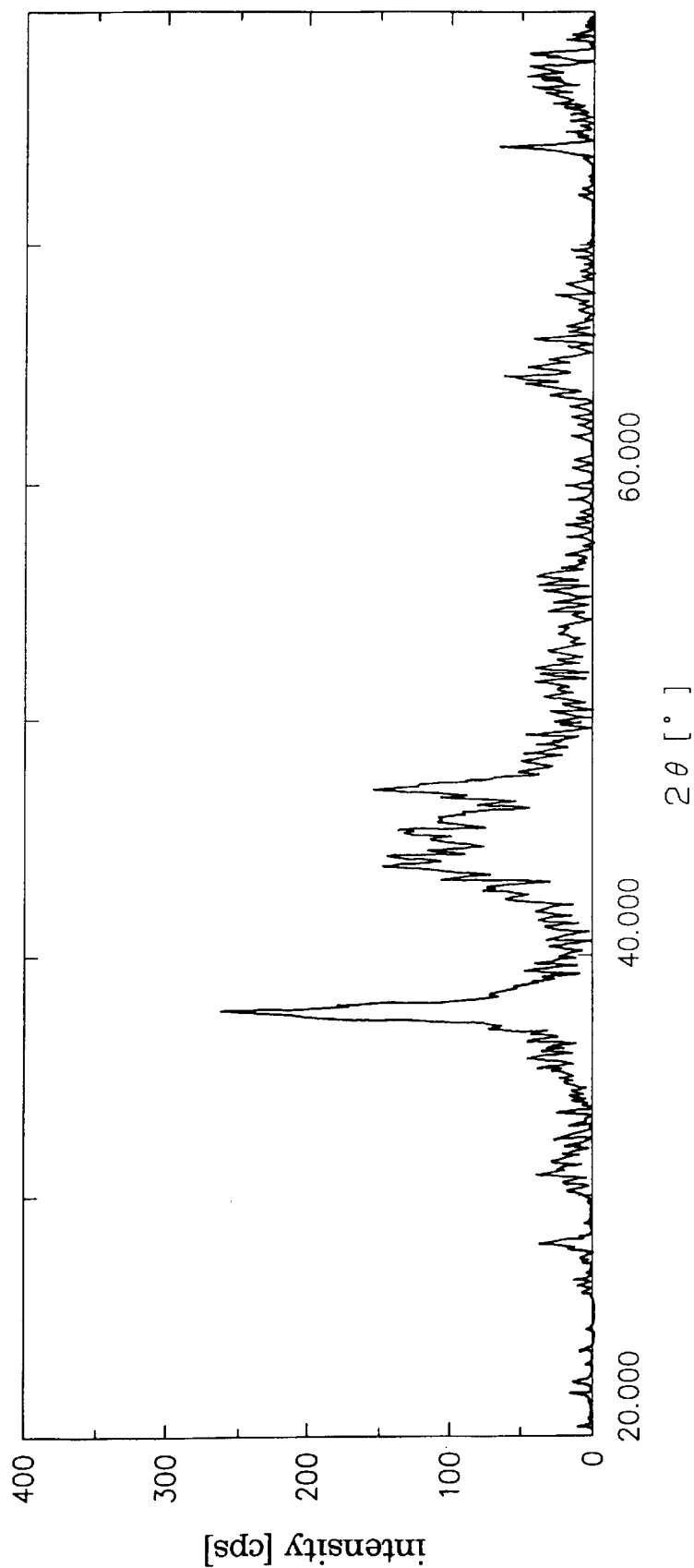
FIG. 11 shows a XRD diffraction chart for an metallic power after the treatment by a planetary ball mill in Example 6 which will be later described.

For the resultant alloy powder, wide angle X-ray diffraction analysis using Kα-rays of Cu as a radiation source was conducted. As a result, there was obtained a X-ray diffraction chart after the planetary ball mill treatment shown in FIG. 11.

Preparation Example 6 of an Electrode Structural Body

In the same manner as in the preparation reference example 1 of the electrode structural body except for using the amorphous alloy powder obtained in the above preparation example 6 instead of the alloy powder obtained in the preparation reference example 1 of the alloy powder, there was prepared an electrode structural body of this example.

Preparation Example 6 of a Rechargeable Battery

In the same manner as in the preparation reference example 1 of the rechargeable battery except for using the electrode structural body obtained in the preparation example 6 of the electrode structural body instead of the electrode structural body obtained in the preparation reference example 1 of the electrode structural body, there was prepared a rechargeable battery of this example.

EXAMPLE 7

Preparation Example 7 of an Alloy Powder as an Anode Material

A powdery Si material having an average particle size of 2 μm, a powdery Ni material having an average particle size of 0.5 μm and a powdery Zr material having an average particle size of 2 μm were mixed at an elemental ratio of 73.9:19.1:7.0 to obtain a mixture. The resultant mixture was subjected to grinding and mixing treatment by the foregoing planetary type ball mill at an acceleration of 17 G for 5 hours. Thus, there was obtained a Si—Ni—Zr amorphous alloy powder.

Figure 12:
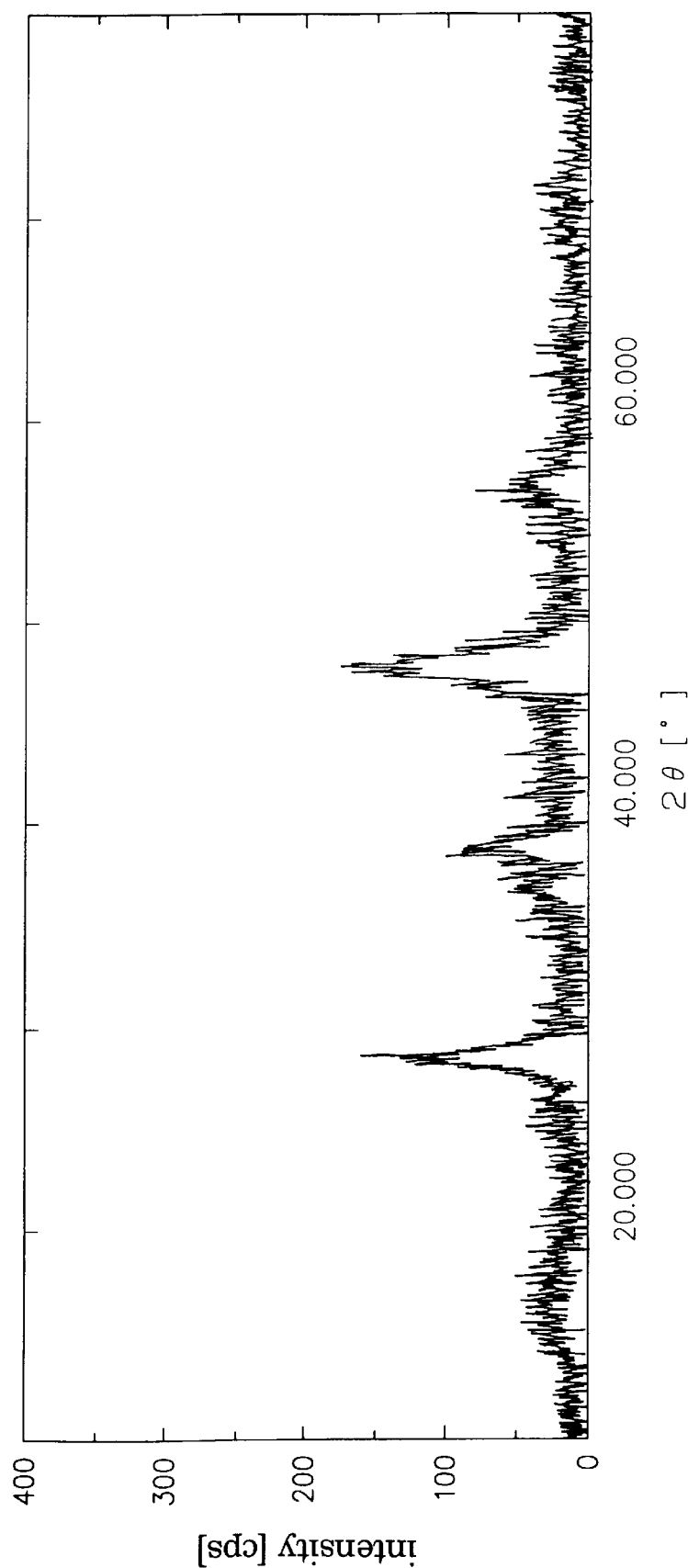
FIG. 12 shows a XRD diffraction chart for an metallic power after the treatment by a planetary ball mill in Example 7 which will be later described.

For the resultant alloy powder, wide angle X-ray diffraction analysis using Kα-rays of Cu as a radiation source was conducted. As a result, there was obtained a X-ray diffraction chart after the planetary ball mill treatment shown in FIG. 12.

Preparation Example 7 of an Electrode Structural Body

In the same manner as in the preparation reference example 1 of the electrode structural body except for using the amorphous alloy powder obtained in the above preparation example 7 instead of the alloy powder obtained in the preparation reference example 1 of the alloy powder, there was prepared an electrode structural body of this example.

Preparation Example 7 of a Rechargeable Battery

In the same manner as in the preparation reference example 1 of the rechargeable battery except for using the electrode structural body obtained in the preparation example 7 of the electrode structural body instead of the electrode structural body obtained in the preparation reference example 1 of the electrode structural body, there was prepared a rechargeable battery of this example.

EXAMPLE 8

Preparation Example 8 of an Alloy Powder as an Anode Material

A powdery Si material having an average particle size of 2 μm and a powdery copper metal material having an average particle size of 1 μm were mixed at an elemental ratio of 50:50 to obtain a mixture. The resultant mixture was subjected to grinding and mixing treatment by the foregoing planetary type ball mill at an acceleration of 17 G for 2 hours. Thus, there was obtained a Si—Cu amorphous alloy powder.

Figure 13:
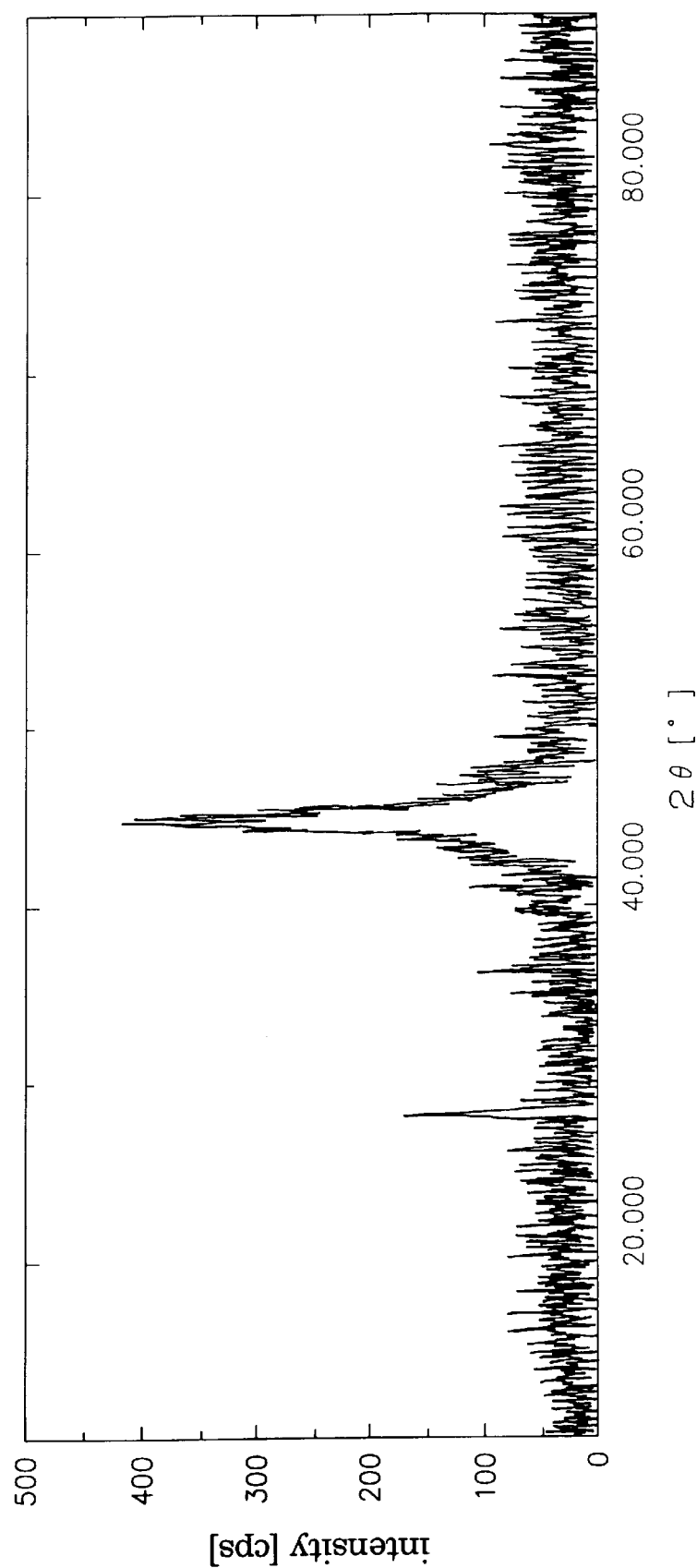
FIG. 13 shows a XRD diffraction chart for an metallic power after the treatment by a planetary ball mill in Example 8 which will be later described.

For the resultant alloy powder, wide angle X-ray diffraction analysis using Kα-rays of Cu as a radiation source was conducted. As a result, there was obtained a X-ray diffraction chart after the planetary ball mill treatment shown in FIG. 13.

And the resultant alloy powder was found to have an average particle size of 2.5 μm.

Preparation Example 8 of an Electrode Structural Body

In the same manner as in the preparation reference example 1 of the electrode structural body except for using the amorphous alloy powder obtained in the above preparation example 8 instead of the alloy powder obtained in the preparation reference example 1 of the alloy powder, there was prepared an electrode structural body of this example.

Preparation Example 8 of a Rechargeable Battery

In the same manner as in the preparation reference example 1 of the rechargeable battery except for using the electrode structural body obtained in the preparation example 8 of the electrode structural body instead of the electrode structural body obtained in the preparation reference example 1 of the electrode structural body, there was prepared a rechargeable battery of this example.

EXAMPLE 9

Preparation Example 9 of an Alloy Powder as an Anode Material

A powdery Si material having an average particle size of 2 μm and a powdery cobalt metal material having an average particle size of 2.5 μm were mixed at an elemental ratio of 50:50 to obtain a mixture. The resultant mixture was subjected to grinding and mixing treatment by the foregoing planetary type ball mill at an acceleration of 17 G for 2 hours. Thus, there was obtained a Si—Co amorphous alloy powder.

Figure 14:
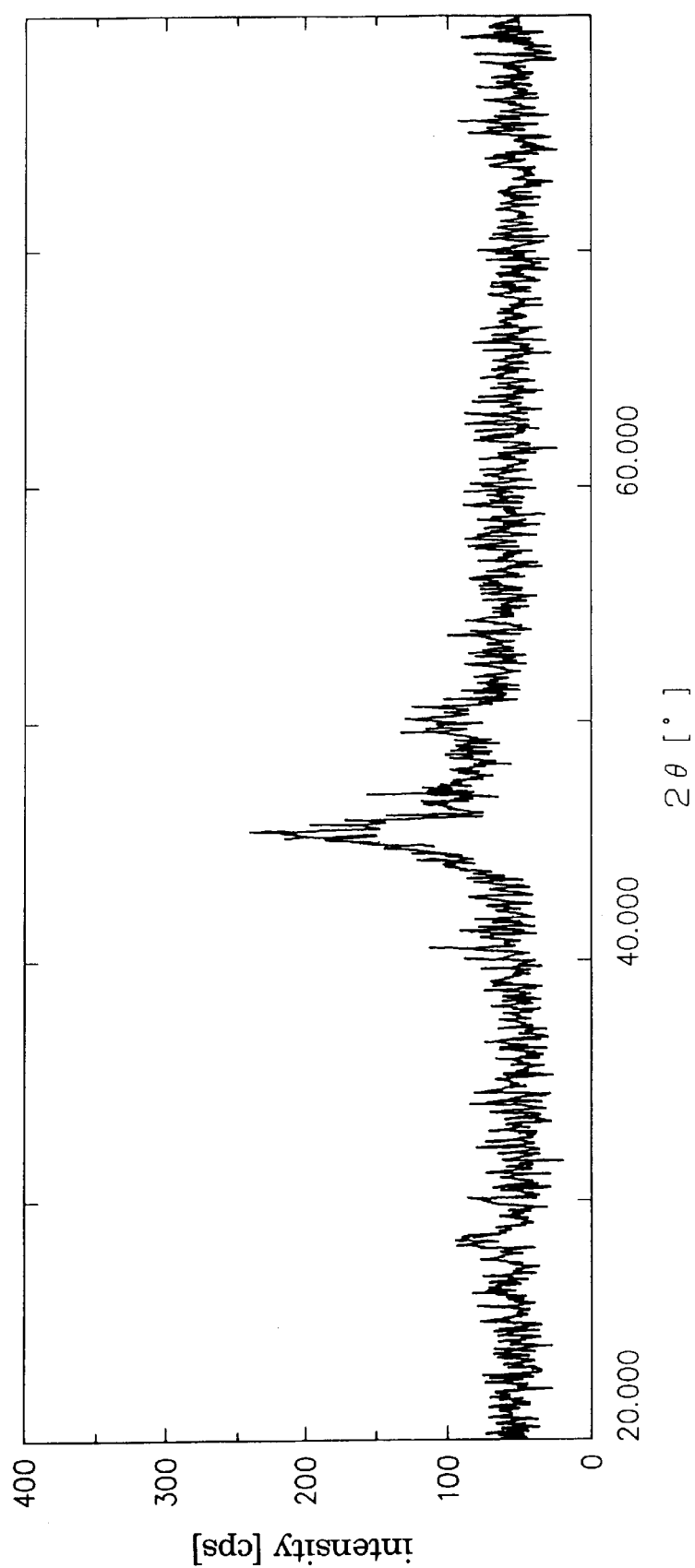
FIG. 14 shows a XRD diffraction chart for an metallic power after the treatment by a planetary ball mill in Example 9 which will be later described.

For the resultant alloy powder, wide angle X-ray diffraction analysis using Kα-rays of Cu as a radiation source was conducted. As a result, there was obtained a X-ray diffraction chart after the planetary ball mill treatment shown in FIG. 14.

And the resultant alloy powder was found to have an average particle size of 2.4 μm.

Preparation Example 9 of an Electrode Structural Body

In the same manner as in the preparation reference example 1 of the electrode structural body except for using the amorphous alloy powder obtained in the above preparation example 9 instead of the alloy powder obtained in the preparation reference example 1 of the alloy powder, there was prepared an electrode structural body of this example.

Preparation Example 9 of a Rechargeable Battery

In the same manner as in the preparation reference example 1 of the rechargeable battery except for using the electrode structural body obtained in the preparation example 9 of the electrode structural body instead of the electrode structural body obtained in the preparation reference example 1 of the electrode structural body, there was prepared a rechargeable battery of this example.

EXAMPLE 10

Preparation Example 10 of an Alloy Powder as an Anode Material

A powdery Si material having an average particle size of 2 μm and a powdery silver metal material having an average particle size of 2.2 μm were mixed at an elemental ratio of 50:50 to obtain a mixture. The resultant mixture was subjected to grinding and mixing treatment by the foregoing planetary type ball mill at an acceleration of 17 G for 2 hours. Thus, there was obtained a Si—Ag amorphous alloy powder.

For the resultant alloy powder, wide angle X-ray diffraction analysis using Kα-rays of Cu as a radiation source was conducted.

And the resultant alloy powder was found to have an average particle size of 2.3 μm.

Preparation Example 10 of an Electrode Structural Body

In the same manner as in the preparation reference example 1 of the electrode structural body except for using the amorphous alloy powder obtained in the above preparation example 10 instead of the alloy powder obtained in the preparation reference example 1 of the alloy powder, there was prepared an electrode structural body of this example.

Preparation Example 10 of a Rechargeable Battery

In the same manner as in the preparation reference example 1 of the rechargeable battery except for using the electrode structural body obtained in the preparation example 10 of the electrode structural body instead of the electrode structural body obtained in the preparation reference example 1 of the electrode structural body, there was prepared a rechargeable battery of this example.

EXAMPLE 11

Preparation Example 11 of an Alloy Powder as an Anode Material

A powdery germanium material having an average particle size of 2.1 μm and a powdery cobalt metal material having an average particle size of 2.2 μm were mixed at an elemental ratio of 50:50 to obtain a mixture. The resultant mixture was subjected to grinding and mixing treatment by the foregoing planetary type ball mill at an acceleration of 17 G for 2 hours. Thus, there was obtained a Ge—Co amorphous alloy powder.

For the resultant alloy powder, wide angle X-ray diffraction analysis using Kα-rays of Cu as a radiation source was conducted.

And the resultant alloy powder was found to have an average particle size of 2.0 μm.

Preparation Example 11 of an Electrode Structural Body

In the same manner as in the preparation reference example 1 of the electrode structural body except for using the amorphous alloy powder obtained in the above preparation example 11 instead of the alloy powder obtained in the preparation reference example 1 of the alloy powder, there was prepared an electrode structural body of this example.

Preparation Example 11 of a Rechargeable Battery

In the same manner as in the preparation reference example 1 of the rechargeable battery except for using the electrode structural body obtained in the preparation example 11 of the electrode structural body instead of the electrode structural body obtained in the preparation reference example 1 of the electrode structural body, there was prepared a rechargeable battery of this example.

EXAMPLE 12

Preparation Example 12 of an Alloy Powder as an Anode Material

A powdery Mg—Ni alloy ($Mg_2Ni$) material having an average particle size of 30 μm and a powdery Ni material having an average particle size of 0.5 μm were mixed so that the elemental ratio of Mg:Ni after the mixing became 50:50, to obtain a mixture. The resultant mixture was subjected to grinding and mixing treatment by the foregoing planetary type ball mill at an acceleration of 17 G for 2 hours. Thus, there was obtained a Mg—Ni amorphous alloy powder.

Figure 15:
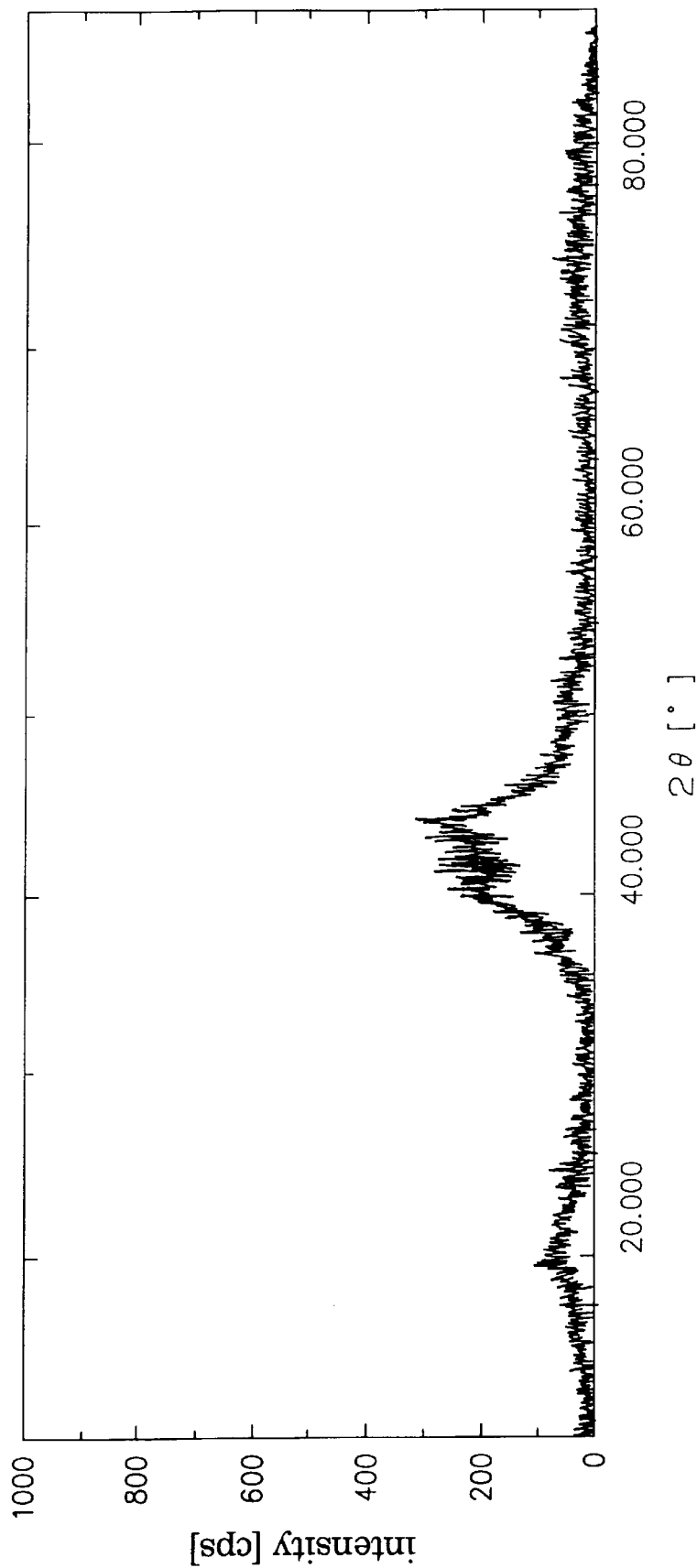
FIG. 15 shows a XRD diffraction chart for an metallic power after the treatment by a planetary ball mill in Example 12 which will be later described.

For the resultant alloy powder, wide angle X-ray diffraction analysis using Kα-rays of Cu as a radiation source was conducted. As a result, there was obtained a X-ray diffraction chart after the planetary ball mill treatment shown in FIG. 15. It is understood that a peak having a widened half width was appeared by the planetary ball mill treatment.

Preparation Example 12 of an Electrode Structural Body

In the same manner as in the preparation reference example 1 of the electrode structural body except for using 5 the amorphous alloy powder obtained in the above preparation example 12 instead of the alloy powder obtained in the preparation reference example 1 of the alloy powder, there was prepared an electrode structural body of this example.

Preparation Example 12 of a Rechargeable Battery

In the same manner as in the preparation reference example 1 of the rechargeable battery except for using the electrode structural body obtained in the preparation example 12 of the electrode structural body instead of the electrode structural body obtained in the preparation reference example 1 of the electrode structural body, there was prepared a rechargeable battery of this example.

MEASURED RESULTS AND EVALUATED RESULTS

Measured results and evaluated results for the alloy powders (the alloy particulates), the electrode structural bodies, and the rechargeable batteries prepared in Examples 1 to 12 and Reference Examples 1 and 2 were as shown in Table 1. Each crystallite size in Table 1 was indicated by a value obtained by substituting data obtained in the X-ray diffraction analysis in the foregoing Scherrer's equation.

For each of the rechargeable batteries, evaluation was conducted with respect to charge-and-discharge (Coulombic) efficiency and charging and discharging cycle life in the following manner.

(1). Charge-and-discharge (Coulombic) Efficiency

Each rechargeable battery is subjected to the following charging and discharging cycle test. That is, a cycle in that charging is performed for 10 hours wherein first charging is performed with a constant electric current of a value of 0.1 C (an electric current of 0.1 time a value of capacity/time) obtained on the basis of an electric capacitance calculated from the cathode active material of the rechargeable lithium battery, when the battery voltage reaches 4.2 V, the first charging is terminated, followed by performing second charging with a constant voltage of 4.2; a pause for 10 minutes is taken; then discharging is performed with a constant electric current of aforesaid value of 0.1 C (the electric current of 0.1 time the value of the capacity/the time) until the battery voltage reaches 2.8 V; and a pause for 10 minutes is taken, is repeated three times. There is obtained a proportion of the discharged electricity quantity to the charged electricity quantity in the third cycle. The proportion thus obtained is made to be a charge-and-discharge (Coulombic) efficiency for the battery.

(2). Charging and Discharging Cycle Life

The charging and discharging cycle life is evaluated in the following manner. The charging and discharging cycle test is conducted by repeating a cycle in that charging is performed for 2.5 hours on the basis of the discharge electric capacitance obtained in the third cycle in the above test (1) wherein first charging is performed with a constant electric current of a value of 0.5 C (an electric current of 0.5 time a value of capacity/time), when the battery voltage reaches 4.2 V, the first charging is terminated, followed by performing second charging with a constant voltage of 4.2; a pause for 10 minutes is taken; then discharging is performed with a constant electric current of aforesaid value of 0.5 C until the battery voltage reaches 2.8 V; and a pause for 10 minutes is taken. And the number of the charging and discharging cycles when the initial battery capacity became less than 60% is made to be a charging and discharging cycle life for the battery.

TABLE 1

| No. | starting material laying-in (atomic ratio) | peak at diffraction angle of 2θ (deg.) | half width (deg) | crystallite size (Å) | charge-and-discharge efficiency (%) | normalized charging and discharging cycle life |
|---|---|---|---|---|---|---|
| Reference Example 1 | $Si_{79.5}Ni_{20.5}$ | 47.2 | 0.4 | 216 | 96 | 4.1 |
| Example 1 | $Si_{79.5}Ni_{20.5}$ | 47.2 | 1.3 | 69 | 98 | 6.1 |
| Example 2 | $Si_{76}Ni_{24}$ | 47.4 | 1.2 | 77 | 97 | 5.2 |
| Example 3 | SiNi | 47.1 | 1.1 | 86 | 95 | 3.8 |
| Reference Example 2 | $SiNi_2$ | 47.2 | 0.4 | 244 | 70 | 1.0 |
| Example 4 | $Si_{32.3}Ni_{67.7}$ | 44.2 | 0.8 | 116 | 78 | 2.1 |
| Example 5 | $Si_{70}Ni_{30}C_{10}$ | 47.6 | 1.1 | 80 | 99 | 3.8 |
| Example 6 | $Si_{45.5}Ni_{55.5}Ag_9$ | 44.0 | 0.9 | 100 | 91 | 2.1 |
| Example 7 | $Si_{73.9}Ni_{19.1}Zr_7$ | 47.7 | 1.2 | 74 | 85 | 1.7 |
| Example 8 | SiCu | 44.6 | 1.3 | 71 | 90 | 1.9 |
| Example 9 | SiCo | 45.5 | 1.1 | 80 | 92 | 2.4 |

TABLE 1-continued

| No. | starting material laying-in (atomic ratio) | peak at diffraction angle of 2θ (deg.) | half width (deg) | crystallite size (Å) | charge-and-discharge efficiency (%) | normalized charging and discharging cycle life |
|---|---|---|---|---|---|---|
| Example 10 | SiAg | 44.1 | 0.6 | 149 | 95 | 4.6 |
| Example 11 | GeCo | 44.6 | 1.0 | 90 | 89 | 2.3 |
| Example 12 | MgNi | 44.6 | 2.8 | 32 | 91 | 1.7 |

On the basis of the results shown in Table 1, when the results of Example 1 with those of Reference Example 1, it is understood that when the amorphization is progressed (the crystallite size is diminished), the charging and discharging cycle life of the battery is prolonged.

In Reference Example 2, there was used the alloy powder obtained from the starting material mixed at a composition ratio which is the same as that of an intermetallic compound $SiN_2$ with a stoichiometric ratio composition by way of quenching in accordance with the atomizing process. For the rechargeable battery prepared using this alloy powder, both its charge-and-discharge efficiency and its charging and discharging cycle life were found to be inferior.

On the other hand, in each of Examples 1 to 12, there was used the alloy powder with the composition (the non-stoichiometric ratio composition in the present invention) which is deviated from the composition ratio of the intermetallic compound. It is understood that any of the rechargeable batteries prepared using said alloy powder has an improved charge-and-discharge efficiency and a prolonged charging and discharging cycle life.

Particularly, according to the measured results of Examples 1 to 4, it is understood that as the content ratio of the Si element is increased, there is a tendency that the charge-and-discharge efficiency is heightened and the charging and discharging cycle life is prolonged.

EXAMPLE 13

The procedures of Example 1 were repeated, except that the binder comprising 2 wt. % of carboxymethyl cellulose and 3 wt. % of polyvinyl alcohol used in the preparation of the electrode structural body in Example 1 was changed to a binder comprising 5 wt. % of polyvinylidene fluoride and the ion-exchanged water as the solvent used in the preparation of the electrode structural body in Example 1 was changed to N-methyl-2-pyrrolidone, to prepare an electrode structural body and a rechargeable battery.

For the electrode structural body and the rechargeable lithium battery obtained in Example 13, in accordance with the previously described manner, evaluation was conducted with respect to charge-and-discharge efficiency, and charging and discharging cycle life. As a results, it was found that although the evaluated results were inferior to but were more or less near those in Example 1.

EXAMPLE 14

The procedures of Example 2 were repeated, except that the binder comprising 2 wt. % of carboxymethyl cellulose and 3 wt. % of polyvinyl alcohol used in the preparation of the electrode structural body in Example 2 was changed to a binder comprising 5 wt. % of polyvinylidene fluoride and the ion-exchanged water as the solvent used in the preparation of the electrode structural body in Example 2 was changed to N-methyl-2-pyrrolidone, to prepare an electrode structural body and a rechargeable battery.

For the electrode structural body and the rechargeable lithium battery obtained in Example 14, in accordance with the previously described manner, evaluation was conducted with respect to charge-and-discharge efficiency, and charging and discharging cycle life. As a results, it was found that although the evaluated results were inferior to but were more or less near those in Example 2.

As detailed in the above, according to the present invention, there is attained an electrode structural body which solves the problems in a conventional rechargeable battery in which oxidation-reduction reaction of lithium is used in that when the rechargeable battery is subjected to repetition of the charging and discharging cycle over a long period of time, the anode is expanded to deteriorate the current-collecting performance and as a result, the charging and discharging cycle life of the battery is shortened. The use of the electrode structural body makes it possible to provide a rechargeable battery having a high battery capacity and a high energy density and which has a prolonged charging and discharging cycle life and exhibits a gently-sloping discharge curve.

What is claimed is:

1. An electrode material for an anode of a rechargeable lithium battery, containing a particulate comprising an amorphous M·A·X alloy with a substantially non-stoichiometric ratio composition wherein in said formula M·A·X, M indicates at least one kind of an element selected from a group consisting of Si, Ge, and Mg, A indicates at least one kind of an element selected from a the group consisting of transition metal elements, X indicates at least one kind of an element selected from a the group consisting of Ba, Sr, Ca, La, Ce, C, P, B, Bi, Sb, Al, In, and Zn, where the element X is optionally present and the content of the constituent element M of the amorphous M·A·X alloy is M/(M+A+X)= 20 to 80 atomic %.

2. An electrode material for an anode according to claim 1, wherein said amorphous M·A·X alloy has a peak appeared in a range of 2θ=25° to 50° in X-ray diffraction using Kα-rays of Cu as a radiation source, having a half width of more than 0.2°.

3. An electrode material for an anode according to claim 1, wherein said amorphous M·A·X alloy has a peak appeared in a range of 2θ=25° to 50° in X-ray diffraction using Kα-rays of Cu as a radiation source, having a half width of more than 0.5°.

4. An electrode material for an anode according to claim 1, wherein said amorphous M·A·X alloy has a peak appeared in a range of 2θ=25° to 50° in X-ray diffraction using Kα-rays of Cu as a radiation source, having a half width of more than 1.0°.

5. An electrode material for an anode according to claim 1, wherein said amorphous M·A·X alloy has a peak appeared in a range of 2θ=40° to 50° in X-ray diffraction using Kα-rays of Cu as a radiation source, having a half width of more than 0.5°.

6. An electrode material for an anode according to claim 1, wherein said amorphous M·A·X alloy has a peak appeared in a range of 2θ=40° to 50° in X-ray diffraction using Kα-rays of Cu as a radiation source, having a half width of more than 1.0°.

7. An electrode material for an anode according to claim 1, wherein said particulate comprising said amorphous M·A·X alloy has a crystallite size calculated from X-ray diffraction analysis, which is less than 500 Å.

8. An electrode material for an anode according to claim 1, wherein said particulate comprising said amorphous M·A·X alloy has a crystallite size calculated from X-ray diffraction analysis, which is less than 200 Å.

9. An electrode material for an anode according to claim 1, wherein said particulate comprising said amorphous M·A·X alloy has a crystallite size calculated from X-ray diffraction analysis, which is less than 100 Å.

10. An electrode material for an anode according to claim 1, wherein said transition metal element comprises at least one kind of an element selected from a group consisting of Cr, Mn, Fe, Co, Ni, Cu, Mo, Tc, Ru, Rh, Pd, Ag, Ir, Pt, Au, Ti, V, Y, Sc, Zr, Nb, Hf, Ta, and W.

11. An electrode material for an anode according to claim 1, wherein said particulate comprising said amorphous M·A·X alloy contains carbon element as a minor amount element in an amount in a range of 0.05% by weight to 5% by weight.

12. An electrode material for an anode according to claim 1, wherein said particulate comprising said amorphous M·A·X alloy has an average particle size in a range of from 0.5 μm to 20 μm.

13. An electrode material for an anode according to claim 1, wherein said particulate comprising said amorphous M·A·X alloy has an average particle size in a range of from 0.5 μm to 10 μm.

14. An electrode material for an anode according to claim 1, wherein said particulate comprising said amorphous M·A·X alloy has a specific surface area of 1 m$^2$/g or more.

15. An electrode material for an anode according to claim 1, wherein said particulate comprising said amorphous M·A·X alloy has a specific surface area of 5 m$^2$/g or more.

16. An electrode material for an anode according to claim 1, wherein said amorphous M·A·X alloy further contains Li element in an amount of from 3% by weight to 30% by weight.

17. An electrode material for an anode according to claim 1, wherein said amorphous M·A·X alloy is Si—Co amorphous alloy, Si—Ni amorphous alloy, Si—Fe amorphous alloy, Si—Cu amorphous alloy, Si—Mo amorphous alloy, Si—Cr amorphous alloy, Si—Ag amorphous alloy, Si—Zr amorphous alloy, Si—Ti amorphous alloy, Si—Nb amorphous alloy, SiY amorphous alloy, Si—Ci—Ni amorphous alloy, Si—Co—Cu amorphous alloy, Si—Co—Fe amorphous alloy, Si—Co—Ag amorphous alloy, Si—Ni—Fe amorphous alloy, Si—Ni—Cu amorphous alloy, Si—Ni—Ag amorphous alloy, Si—Ni—Mo amorphous alloy, Si—Ni—Nb amorphous alloy, Si—Cu—Fe amorphous alloy, Si—Co—Fe—Ni—Cr amorphous alloy, Si—Co—Fe—Ni—Cr—Mn amorphous alloy, Si—Co—Cu—Fe—Ni—Cr amorphous alloy, Si—Co—Cu—Fe—Ni—Cr—Mn amorphous alloy, Si—Zr—Fe—Ni—Cr amorphous alloy, Si—Zr—Cu—Fe—Ni—Cr—Mn amorphous alloy, Si—Mo—Fe—Ni—Cr amorphous alloy, Si—Mo—Cu—Fe—Ni—Cr—Mn amorphous alloy, Si—Ti—Fe—Ni—Cr amorphous alloy, or Si—Ti—Cu—Fe—Ni—Cr—Mn amorphous alloy.

18. An electrode material for an anode according to claim 1, wherein said amorphous M·A·X alloy is Si—Co—C amorphous alloy, Si—Ni—C amorphous alloy, Si—Fe—C amorphous alloy, Si—Cu—C amorphous alloy, Si—Fe—Ni—Cr—C amorphous alloy, Si—Co—Fe—Ni—Cr—C amorphous alloy, Si—Cu—Fe—Ni—Cr—C amorphous alloy, Si—Co—Fe—Ni—Cr—Mn—C amorphous alloy, Si—Co—Cu—Fe—Ni—Cr—C amorphous alloy, Si—Co—Cu—Fe—Ni—Cr—Mn—C amorphous alloy, Si—Co—La amorphous alloy, Si—Ni—La amorphous alloy, Si—Fe—La amorphous alloy, Si—Cu—La amorphous alloy, Si—Co—La—Fe—Ni—Cr amorphous alloy, Si—Cu—La—Fe—Ni—Cr amorphous alloy, Si—La—Fe—Ni—Cr amorphous alloy, Si—Co—Ca amorphous alloy, Si—Ni—Ca amorphous alloy, Si—Fe—Ca amorphous alloy, Si—Cu—Ca amorphous alloy, Si—Co—Ca—Fe—Ni—Cr amorphous alloy, Si—Cu—Ca—Fe—Ni—Cr amorphous alloy, Si—Ca—Fe—Ni—Cr amorphous alloy, Si—Co—Zn amorphous alloy, Si—Ni—Zn amorphous alloy, Si—Fe—Zn amorphous alloy, Si—Cu—Zn amorphous alloy, Si—Co—Zn—Fe—Ni—Cr amorphous alloy, Si—Cu—Zn—Fe—Ni—Cr amorphous alloy, Si—Zn—Fe—Ni—Cr amorphous alloy, Si—Co—Al amorphous alloy, Si—Ni—Al amorphous alloy, Si—Fe—Al amorphous alloy, Si—Cu—Al amorphous alloy, Si—Co—Al—Fe—Ni—Cr amorphous alloy, Si—Cu—Al—Fe—Ni—Cr amorphous alloy, Si—Al—Fe—Ni—Cr amorphous alloy, Si—Co—P amorphous alloy, Si—Ni—P amorphous alloy, Si—Fe—P amorphous alloy, Si—Cu—P amorphous alloy, Si—Co—P—Fe—Ni—Cr amorphous alloy, Si—Cu—P—Fe—Ni—Cr amorphous alloy, Si—P—Fe—Ni—Cr amorphous alloy, Si—Co—B amorphous alloy, Si—Ni—B amorphous alloy; Si—Fe—B amorphous alloy, Si—Cu—B amorphous alloy, Si—Co—B—Fe—Ni—Cr amorphous alloy, Si—Cu—B—Fe—Ni—Cr amorphous alloy, or Si—B—Fe—Ni—Cr amorphous alloy.

19. An electrode material for an anode according to claim 1, wherein said amorphous M·A·X alloy is Si—Co—Mg amorphous alloy, Si—Ni—Mg amorphous alloy, Si—Fe—Mg amorphous alloy, Si—Cu—Mg amorphous alloy, Si—Co—Mg—Fe—Ni—Cr amorphous alloy, Si—Cu—Mg—Fe—Ni—Cr amorphous alloy, Si—Mg—Fe—Ni—Cr amorphous alloy, Si—Co—Ge amorphous alloy, Si—Ni—Ge amorphous alloy, Si—Fe—Ge amorphous alloy, Si—Cu—Ge amorphous alloy, Si—Co—Ge—Fe—Ni—Cr amorphous alloy, Si—Cu—Ge—Fe—Ni—Cr amorphous alloy, Si—Ge—Fe—Ni—Cr amorphous alloy, Si—Ge—Mg—Co amorphous alloy, Si—Ge—Mg—Ni amorphous alloy, Si—Ge—Mg—Fe amorphous alloy, Si—Ge—Mg—Cu amorphous alloy, Si—Ge—Mg—Co—Fe—Ni—Cr amorphous alloy, Si—Ge—Mg—Cu—Fe—Ni—Cr amorphous alloy, or Si—Ge—Mg—Fe—Ni—Cr amorphous alloy.

20. An electrode structural body comprising said electrode material for an anode containing said particulate comprising said amorphous M·A·X alloy defined in claim 1 and a collector comprising a material incapable of being alloyed with lithium in electrochemical reaction.

21. An electrode structural body according to claim 20, wherein the amount of said amorphous M·A·X alloy in said electrode structural body is 25% by weight or more.

22. An electrode structural body according to claim 20, wherein said electrode structural body has an electrode material layer comprising said electrode material for an anode and a binder on said collector.

23. An electrode structural body according to claim 22, wherein the amount of said particulate comprising said amorphous M·A·X alloy in said electrode material layer is in a range of from 80% by weight to 99% by weight.

24. An electrode structural body according to claim 22, wherein said binder comprises an organic polymer.

25. An electrode structural body according to claim 24, wherein said organic polymer is a water-soluble organic polymer.

26. An electrode structural body according to claim 25, wherein said water-soluble organic polymer comprises at least one kind of an organic polymer selected from a group consisting of polyvinyl alcohol, carboxymethyl cellulose, methyl cellulose, ethyl cellulose, isopropyl cellulose, hydroxymethyl cellulose, hydroxyethyl cellulose, hydroxypropylmethyl cellulose, cyanoethyl cellulose, ethylhydroxyethyl cellulose, starch, dextran, pullulan, polysarcosine, polyoxyethlene, polyN-vinylpyrrolidone, gum arabic, tragacanth gum, and polyvinyl acetate.

27. An electrode structural body according to claim 24, wherein said organic polymer is a water-insoluble organic polymer.

28. An electrode structural body according to claim 27, wherein said water-insoluble organic polymer comprises at least one kind of an organic polymer selected from a group consisting of polyvinyl fluoride, polyvinylidene fluoride, tetrafluoroethylene polymer, trifluoroethylene polymer, difluoroethylene polymer, ethylenetetrafluoroethylene copolymer, tetrafluoroethylenehexafluoropropylene copolymer, tetrafluoroethyleneperfluoroalkylvinyl ether copolymer, trifluoroetylene chloride polymer, polyethylene, polypropylene, ethylenepropylene-diene terpolymer, silicone resin, polyvinyl chloride, and polyvinyl butyral.

29. An electrode structural body according to claim 20, wherein said electrode structural body has an electrode material layer comprising said electrode material for an anode, an electrically conductive auxiliary, and a binder on said collector.

30. An electrode structural body according to claim 29, wherein said binder comprises an organic polymer.

31. An electrode structural body according to claim 30, wherein said organic polymer is a water-soluble organic polymer.

32. An electrode structural body according to claim 31, wherein said water-soluble organic polymer comprises at least one kind of an organic polymer selected from a group consisting of polyvinyl alcohol, carboxymethyl cellulose, methyl cellulose, ethyl cellulose, isopropyl cellulose, hydroxymethyl cellulose, hydroxyethyl cellulose, hydroxypropylmethyl cellulose, cyanoethyl cellulose, ethylhydroxyethyl cellulose, starch, dextran, pullulan, polysarcosine, polyoxyethlene, polyN-vinylpyrrolidone, gum arabic, tragacanth gum, and polyvinyl acetate.

33. An electrode structural body according to claim 30, wherein said organic polymer is a water-insoluble organic polymer.

34. An electrode structural body according to claim 33, wherein said water-insoluble organic polymer comprises at least one kind of an organic polymer selected from a group consisting of polyvinyl fluoride, polyvinylidene fluoride, tetrafluoroethylene polymer, trifluoroethylene polymer, difluoroethylene polymer, ethylenetetrafluoroethylene copolymer, tetrafluoroethylenehexafluoropropylene copolymer, tetrafluoroethyleneperfluoroalkylvinyl ether copolymer, trifluoroetylene chloride polymer, polyethylene, polypropylene, ethylenepropylene-diene terpolymer, silicone resin, polyvinyl chloride, and polyvinyl butyral.

35. A rechargeable lithium battery having an anode, an electrolyte, and a cathode and in which oxidation-reduction reaction of lithium is used, characterized in that said anode comprises said electrode structural body defined in any of claims 20 to 34.

36. A rechargeable lithium battery according to claim 35, wherein said cathode comprises a lithium element-containing material having a function of deintercalating lithium ion and intercalating said lithium ion in charge-and-discharge reaction.

37. A rechargeable lithium battery according to claim 36, wherein said lithium element-containing material as the constituent material of said cathode contains an amorphous phase.

38. A rechargeable lithium battery according to claim 36, wherein said lithium element-containing material as the constituent material of said cathode contains an amorphous phase including a metal oxide material.

39. A process for producing an electrode structural body for a rechargeable lithium battery, said process is characterized by having a step of arranging said electrode material for an anode containing said particulate comprising said amorphous M·A·X alloy defined in any of claim 1 on a collector.

40. A process for producing an electrode structural body for a rechargeable lithium battery according to claim 39, wherein said step includes a step of arranging said particulate comprising said amorphous M·A·X alloy on said collector by way of press forming.

41. A process for producing an electrode structural body for a rechargeable lithium battery according to claim 39, wherein said step includes a step of preparing a paste material by mixing said particulate comprising said amorphous M·A·X alloy with a binder and arranging said paste material on said collector.

42. A process for producing an electrode structural body for a rechargeable lithium battery according to claim 41, wherein a binder comprising an organic polymer is used as said binder.

43. A process for producing an electrode structural body for a rechargeable lithium battery according to claim 42, wherein said organic polymer is a water-soluble organic polymer or a water-insoluble organic polymer.

44. A process for producing an electrode structural body for a rechargeable lithium battery according to claim 43, wherein said water-soluble organic polymer comprises at least one kind of an organic polymer selected from a group consisting of polyvinyl alcohol, carboxymethyl cellulose, methyl cellulose, ethyl cellulose, isopropyl cellulose, hydroxymethyl cellulose, hydroxyethyl cellulose, hydroxypropylmethyl cellulose, cyanoethyl cellulose, ethylhydroxyethyl cellulose, starch, dextran, pullulan, polysarcosine, polyoxyethlene, polyN-vinylpyrrolidone, gum arabic, tragacanth gum, and polyvinyl acetate.

45. A process for producing an electrode structural body for a rechargeable lithium battery according to claim 43, wherein said water-insoluble organic polymer comprises at least one kind of an organic polymer selected from a group consisting of polyvinyl fluoride, polyvinylidene fluoride, tetrafluoroethylene polymer, trifluoroethylene polymer, difluoroethylene polymer, ethylene-tetrafluoroethylene copolymer, tetrafluoroethylene-hexafluoropropylene copolymer, tetrafluoroethyleneperfluoroalkylvinyl ether copolymer, trifluoroetylene chloride polymer, polyethylene, polypropylene, ethylene-propylene-diene terpolymer, silicone resin, polyvinyl chloride, and polyvinyl butyral.

46. A process for producing a rechargeable lithium battery having an anode, an electrolyte, and a cathode and in which oxidation-reduction reaction of lithium is used, said process is characterized by having a step of forming said anode by arranging said electrode material for an anode containing said particulate comprising said amorphous M·A·X alloy defined in claim 1 on a collector.

47. A process for producing a rechargeable lithium battery according to claim 46, wherein said step of forming said anode includes a step of arranging said particulate comprising said amorphous M·A·X alloy on said collector by way of press forming.

48. A process for producing a rechargeable lithium battery according to claim 46, wherein said step of forming said anode includes a step of preparing a paste material by mixing said particulate comprising said amorphous M·A·X alloy with a binder and arranging said paste material on said collector.

49. A process for producing a rechargeable lithium battery according to claim 46, wherein a binder comprising an organic polymer is used as said binder.

50. A process for producing a rechargeable lithium battery according to claim 49, wherein said organic polymer is a water-soluble organic polymer.

51. A process for producing a rechargeable lithium battery according to claim 50, wherein said water-soluble organic polymer comprises at least one kind of an organic polymer selected from a group consisting of polyvinyl alcohol, carboxymethyl cellulose, methyl cellulose, ethyl cellulose, isopropyl cellulose, hydroxymethyl cellulose, hydroxyethyl cellulose, hydroxypropylmethyl cellulose, cyanoethyl cellulose, ethyl-hydroxyethyl cellulose, starch, dextran, pullulan, polysarcosine, polyoxyethlene, polyN-vinylpyrrolidone, gum arabic, tragacanth gum, and polyvinyl acetate.

52. A process for producing a rechargeable lithium battery according to claim 49, wherein said organic polymer is a water-insoluble organic polymer.

53. A process for producing a rechargeable lithium battery according to claim 52, wherein said water-insoluble organic polymer comprises at least one kind of an organic polymer selected from a group consisting of polyvinyl fluoride, polyvinylidene fluoride, tetrafluoroethylene polymer, trifluoroethylene polymer, difluoroethylene polymer, ethylene-tetrafluoroethylene copolymer, tetrafluoroethylenehexafluoropropylene copolymer, tetrafluoroethylene-perfluoroalkylvinyl ether copolymer, trifluoroetylene chloride polymer, polyethylene, polypropylene, ethylene-propylene-diene terpolymer, silicone resin, polyvinyl chloride, and polyvinyl butyral.

* * * * *

UNITED STATES PATENT AND TRADEMARK OFFICE
CERTIFICATE OF CORRECTION

PATENT NO. : 6,730,434 B1
DATED : May 4, 2004
INVENTOR(S) : Soichiro Kawakami et al.

It is certified that error appears in the above-identified patent and that said Letters Patent is hereby corrected as shown below:

<u>Title page,</u>
Item [56], References Cited, FOREIGN PATENT DOCUMENTS, "JP 9245771" should read -- JP 9-245771 --.

<u>Column 2,</u>
Line 54, "above" should read -- above --.

<u>Column 3,</u>
Line 26, "used" should read -- used as --.
Line 59, "coase-grained" should read -- coarse-grained --.

<u>Column 6,</u>
Line 10, "a XRD" should read -- an XRD --.
Lines 13, 16, 19, 22, 25, 28, 31, 34, 37, and 40, "a XRD" should read -- an XRD --, and "an metallic" should read -- a metallic --.
Lines 14, 17, 20, 23, 26, 29, 32, 35, 38 and 41, "power" should read -- powder --.

<u>Column 8,</u>
Line 15, "in the" should be deleted.
Line 17, "Illustrate" should read -- illustrated --.
Line 29, "Si–Ci–Ni" should read -- Si–Co–Ni --.
Line 47, "consisting" should read -- consisting of --.

<u>Column 14,</u>
Line 51, "an small" should read -- a small --.

<u>Column 15,</u>
Line 40, "a increased" should read -- an increased --.
Line 41, "in a" should read -- in an --.
Line 63, "never" should read -- never been --.

<u>Column 16,</u>
Line 42, "aX-ray" should read -- an X-ray --.

<u>Column 17,</u>
Line 52, "preferred" should read -- preferred to --.

UNITED STATES PATENT AND TRADEMARK OFFICE
CERTIFICATE OF CORRECTION

PATENT NO. : 6,730,434 B1
DATED : May 4, 2004
INVENTOR(S) : Soihiro Kawakami et al.

It is certified that error appears in the above-identified patent and that said Letters Patent is hereby corrected as shown below:

Column 19,
Line 5, "a X-ray" should read -- an X-ray --.
Line 42, "above" should read -- above- --.
Line 55, "sulf olan" should read -- sulfolan --.

Column 20,
Line 43, "takes" should read -- take --.
Line 63, "each," should read -- each --.
Line 67, "and." should read -- and --.

Column 22,
Line 39, "an gas" should read -- a gas --.
Lines 41 and 45, "a X-ray" should read -- an X-ray --.
Line 46, "Reference" should begin a new paragraph.

Column 23,
Line 20, "subjected" should read -- subjected to --.
Line 26, "N-methyl-2-pyrroidone" should read -- N-methyl-2-pyrrolidone --.

Column 24,
Lines 27 and 66, "a X-ray" should read -- an X-ray --.

Column 25,
Line 43, "a X-ray" should read -- an X-ray --.

Column 26,
Line 9, "an gas" should read -- a gas --.
Line 49, "a X-ray" should read -- an X-ray --.

Column 27,
Lines 20 and 58, "a X-ray" should read -- an X-ray --.

Column 28,
Lines 29 and 65, "a X-ray" should read -- an X-ray --.

Column 29,
Line 37, "a X-ray" should read -- an X-ray --.

Column 31,
Line 19, "a X-ray" should read -- an X-ray --.

UNITED STATES PATENT AND TRADEMARK OFFICE
CERTIFICATE OF CORRECTION

PATENT NO. : 6,730,434 B1
DATED : May 4, 2004
INVENTOR(S) : Soichiro Kawakami et al.

It is certified that error appears in the above-identified patent and that said Letters Patent is hereby corrected as shown below:

Column 34,
Lines 39 and 41, "a the group" should read -- a group --.

Column 35,
Line 50, "SiY" should read -- Si–Y --, and "Si–Ci–Ni" should read -- Si–Co–Ni --.

Column 37,
Line 23, "tetrafluoroethylenehexafluoropropylene" should read
-- tetrafluoroethylene-hexafluoropropylene --.
Line 24, "tetrafluoroethyleneperfluoroalkylvinyl" should read
-- tetrafluoroethylene-perfluoroalkylvinyl --.
Line 25, "trifluoroetylene" should read -- trifluoroethylene --.
Line 56, "ethylenetetrafluoroethylene" should read -- ethylene-tetrafluoroethylene --.
Line 57, "tetrafluoroethylenehexafluoropropylene" should read
-- tetrafluoroethylene-hexafluoropropylene --.
Line 58, "tetrafluoroethyleneperfluoroalkylvinyl" should read
-- tetrafluoroethylene-perfluoroalkylvinyl --.
Line 59, "trifluoroetylene" should read -- trifluoroethylene --.

Column 38,
Line 55, "tetrafluoroethyleneperfluoroalkylvinyl" should read
-- tetrafluoroethylene-perfluoroalkylvinyl --.

Column 40,
Line 14, "tetrafluoroethylenehexafluoropropylene" should read
-- tetrafluoroethylene-hexafluoropropylene --.

Signed and Sealed this

Nineteenth Day of October, 2004

JON W. DUDAS
*Director of the United States Patent and Trademark Office*